(12) United States Patent
Hemmelgarn et al.

(10) Patent No.: US 8,678,324 B2
(45) Date of Patent: *Mar. 25, 2014

(54) PASSIVE ADAPTIVE STRUCTURES

(75) Inventors: Christopher Douglas Hemmelgarn, South Charleston, OH (US); Bryan Michael Pelley, Miamisburg, OH (US); Kristin Marie Cable, Monroe, OH (US); Brandon Charles Kirby, LaVale, MD (US)

(73) Assignee: Cornerstone Research Group, Inc., Dayton, OH (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/918,408

(22) PCT Filed: Feb. 20, 2009

(86) PCT No.: PCT/US2009/034628
§ 371 (c)(1),
(2), (4) Date: Dec. 15, 2010

(87) PCT Pub. No.: WO2009/137143
PCT Pub. Date: Nov. 12, 2009

(65) Prior Publication Data
US 2011/0084174 A1      Apr. 14, 2011

Related U.S. Application Data

(60) Provisional application No. 61/030,357, filed on Feb. 21, 2008.

(51) Int. Cl.
*B64C 3/44* (2006.01)
*B64C 3/00* (2006.01)
*B64C 13/16* (2006.01)

(52) U.S. Cl.
USPC ........ 244/219; 244/203; 244/213; 244/123.1; 416/240

(58) Field of Classification Search
USPC ......... 244/201, 203, 211–217, 219, 87, 90 R, 244/123.1; 416/240
See application file for complete search history.

(56) References Cited

U.S. PATENT DOCUMENTS 1,690,765 A * 11/1928 Antoni .......................... 244/203
3,118,639 A * 1/1964 Kiceniuk ...................... 244/219
(Continued)

FOREIGN PATENT DOCUMENTS

DK   2004099608   11/2004
DK   2008003330   1/2008
(Continued)

OTHER PUBLICATIONS

United States Statutory Invention Registration, Reg. No. US H2057 H, Filed: Jan 10, 2001 Published Jan. 7, 2003 Inventor / Applicant: Veers et al.

(Continued)

*Primary Examiner* — Joseph W Sanderson
(74) *Attorney, Agent, or Firm* — Dinsmore & Shohl LLP

(57) ABSTRACT

Embodiments of the present airfoil systems comprise an airfoil with a leading edge, a trailing edge, an upper surface, a lower surface, and a skin surface, at least one structural element located within said airfoil, wherein said structural element supports the skin surface having an upper skin portion and a lower skin portion wherein said structural element can change its shape in response to external stimulus during flight operations, and an actuating means for selectively altering the curvature of said structural element which alters the curvature of said upper skin portion and of said lower skin portion to cause nonlinear deflection of said skin surface between an extreme raised position through a neutral position to an extreme lowered position; whereby the outer surface curvature of said airfoil and said skin surface is smooth and continuous over substantially the entirety thereof at all positions of said skin surface.

17 Claims, 20 Drawing Sheets

(56) References Cited

U.S. PATENT DOCUMENTS

| | | | |
|---|---|---|---|
| 3,172,621 A * | 3/1965 | Erwin | 244/207 |
| 3,447,768 A * | 6/1969 | McQueen | 244/135 R |
| 4,102,519 A * | 7/1978 | Crosby, Jr. | 244/125 |
| 4,651,955 A | 3/1987 | Krafka | |
| 4,796,192 A | 1/1989 | Lewis | |
| 5,288,039 A | 2/1994 | DeLaurier et al. | |
| 5,409,200 A | 4/1995 | Zingher et al. | |
| 5,433,404 A * | 7/1995 | Ashill et al. | 244/200 |
| 5,527,151 A | 6/1996 | Coleman et al. | |
| 5,681,014 A | 10/1997 | Palmer | |
| 5,794,893 A * | 8/1998 | Diller et al. | 246/213 |
| 5,887,828 A | 3/1999 | Appa | |
| 6,045,096 A | 4/2000 | Rinn et al. | |
| 6,161,801 A | 12/2000 | Kelm et al. | |
| 6,173,924 B1 | 1/2001 | Young et al. | |
| 6,199,796 B1 * | 3/2001 | Reinhard et al. | 244/35 R |
| 6,276,641 B1 | 8/2001 | Gruenewald et al. | |
| 6,588,709 B1 * | 7/2003 | Dunne et al. | 244/201 |
| 6,644,599 B2 * | 11/2003 | Perez | 244/219 |
| 6,759,481 B2 | 7/2004 | Tong | |
| 6,766,981 B2 | 7/2004 | Volk | |
| 7,118,338 B2 | 10/2006 | Moroz et al. | |
| 7,118,339 B2 | 10/2006 | Moroz et al. | |
| 7,344,360 B2 | 3/2008 | Wetzel | |
| 7,384,016 B2 | 6/2008 | Kota et al. | |
| 7,669,799 B2 * | 3/2010 | Elzey et al. | 244/123.12 |
| 7,690,895 B2 | 4/2010 | Moroz | |
| 8,215,908 B2 * | 7/2012 | Altmikus et al. | 416/23 |
| 2006/0163431 A1 | 7/2006 | Dittrich | |
| 2006/0186269 A1 * | 8/2006 | Kota et al. | 244/123.1 |
| 2007/0036653 A1 | 2/2007 | Bak et al. | |
| 2007/0257821 A1 | 11/2007 | Son et al. | |
| 2008/0226448 A1 * | 9/2008 | Altmikus et al. | 416/23 |
| 2010/0127504 A1 | 5/2010 | Hancock | |
| 2011/0042524 A1 * | 2/2011 | Hemmelgarn et al. | 244/203 |

FOREIGN PATENT DOCUMENTS

| | | |
|---|---|---|
| DK | 2009026929 | 3/2009 |
| DK | 2009056136 | 5/2009 |
| EP | 1316651 A1 | 6/2003 |
| EP | 2008132235 | 11/2008 |
| GB | 2129748 | 5/1984 |
| GB | 2140364 | 11/1984 |
| GB | 2462307 | 3/2010 |
| NL | 2009054714 | 4/2009 |
| WO | 2004099608 A1 | 11/2004 |
| WO | PCT/2005015685 | 5/2005 |
| WO | 2005108448 A1 | 11/2005 |
| WO | PCT/2006062179 | 12/2006 |
| WO | 2007045940 | 4/2007 |
| WO | 2007045940 A1 | 4/2007 |
| WO | 2007070877 A2 | 6/2007 |
| WO | 2008003330 A1 | 1/2008 |
| WO | 2008132235 A1 | 11/2008 |
| WO | 2009026929 A1 | 3/2009 |
| WO | 2009032384 | 3/2009 |
| WO | 2009032384 A2 | 3/2009 |
| WO | 2009050550 | 4/2009 |
| WO | 2009050550 A2 | 4/2009 |
| WO | 2009054714 A1 | 4/2009 |
| WO | 2009056136 A2 | 5/2009 |

OTHER PUBLICATIONS

International Search Report for International Application No. PCT/US09/34628 dated Sep. 29, 2009.

International Preliminary Report on Patentability for International Application No. PCT/US09/34628 dated Aug. 24, 2010.

European Search Report for Application No. 09743130.8 dated Feb. 7, 2011.

* cited by examiner

PASSIVE ADAPTIVE STRUCTURES

CROSS REFERENCE TO RELATED APPLICATIONS

This application claims priority from U.S. Provisional Application Ser. No. 61/030,357 filed Feb. 21, 2008.

This invention was made with government support by the Defense Advanced Projects Agency (DARPA) under Contract Number W31P4Q-08-C-0206. The government has certain rights in this application pursuant to the contract.

BACKGROUND OF THE INVENTION

1. Field of the Invention

The presently claimed device is a high-altitude, long endurance (HALE) aircraft wing design. The claimed device consists of a design that allows HALE aircraft to respond passively to aerodynamic loads for mitigating the effects of gust conditions leading towards structural weight reductions and performance improvements while still maintaining stable flight. The main discriminator of the presently claimed design allows for a reduced structural mass fraction in the wings.

2. Description of Related Art

Adaptive structures have been a focus of attention for the last decade in their ability to offer aircraft, automotive, and wind turbine industries significant leaps in performance, whether it be reliability, speed, efficiency, etc. Several approaches, both passive and active, have been demonstrated for use in adaptive structures, but none compare to the Active and Passive Adaptive approaches currently presented. Examples of adaptive approaches include: Piezoelectric Uni/Bi-morph composites; compliant structures; rigid body, lumped compliance in adaptive structures; asymmetric, unbalanced composite laminates for bend/twist coupling; and inflatable structures using variable pressure, or piezoelectric actuation.

There have been many attempts to design a wing that changes shape, or morphs on command or at some predetermined design characteristic. Almost all of these attempts involve some form of active control to change the shape of the wing. The key discriminators between the prior art and the currently claimed device is the focus on reduced weight while maintaining aerodynamic characteristics and designs that allow non-linear deflections through passive morphing of the aircraft while in flight.

Prior Morphing Wings and Aerodynamic Shapes

The design of conventional fixed wing aircraft has historically balanced the conflicting requirements of multiple mission segments for a given application. The result is typically a vehicle that has average performance over a range of mission segments, such as takeoff, cruise, dash, loiter, and landing; or optimal performance in the mission segment within which the most time is spent; and below average performance in other mission segments. Conventional mechanisms that result in the geometric changes that enable operation over multiple mission segments, such as ailerons, elevators, rudders, flaps and slats, are normally part of control systems that ensure the vehicle will be able to operate within a desired flight envelope, but the implementation of these systems does not typically result in a design that can continually respond and adapt to changing environmental or aerodynamic conditions in the most efficient manner.

The development of new smart materials, together with the always present need for better performance, is increasingly prompting designers towards the concept of morphing aircraft. These aircraft possess the ability to adapt and optimize their shapes to achieve dissimilar, multi-objective mission roles efficiently and effectively. Motivations for such unmanned aircraft are birds that morph between loiter and attack missions by changing their wing configuration accordingly. Birds also use camber and twist for flight control. The Wright Brothers used wing warping as a seamless flight control in their first flying machine. Morphing wings for flight control bring new challenges to the design of control laws for flight.

There are typically three primary reasons for morphing; (1) improve the aircrafts performance over a wide range of flight regimes; (2) offer multi-role capability in a single aircraft system; (3) improve aircraft survivability by offering the ability to adapt and respond to environmental or vehicle conditions. These different applications are all regarded as morphing; however, each is very different in terms of the magnitude of the shape changes required and time constants necessary for these changes. Fortunately large changes (global shape change) for multi-role capabilities are only required at low frequency, and very fast changes for flight control (local shape change) only need to be small amplitude relative to the global changes in shape. This means that there is likely never going to be a single solution for a morphing aircraft, and the technology employed will be vastly different depending on the application required. However, all applications require that morphing achieve the objective of improved performance and/or capability. Previously, this improvement was at the expense of increased weight and complexity, and the performance improvement must account for this.

Large-scale shape changes for configuration morphing (that is significant planform changes) include wing extension, wing folding, and wing sweep. Significant aerodynamic performance gains were previously only achievable through large overall changes in the aircraft geometry via wing sweep, area, and/or span. The application of morphing to flight control usually involves small geometric wing changes such as the use of ailerons, elevators, flaperons, and so forth, as well as wing warping techniques to enhance the control authority of the aircraft. Prior art in both of these categories, shows that these medium to large-scale changes are obtained with complex and sophisticated mechanical devices, significantly increasing the installation and maintenance costs as well as the structural weight of the airframe. It is clear therefore, that substantial gains in these areas could be made if alternative methods to enact these changes were found. Basic morphing motions for seamless flight control include wing twist, wing chamber change, and asymmetric wing extension. The use of winglets as control effectors may also yield substantial benefits.

There are many challenges in the design of morphing aircraft: the integrity of compliant structures needs to be ensured, the system should be designed so the required actuation force is realizable, the skin has to be designed to give a smooth aerodynamic surface yet support the aerodynamic loads, the design process should be extended to encompass multiple flight regimes, engines need to be designed for efficient low and high speed operation, and control systems will have to cope with highly coupled control effectors.

HALE Platforms

High-altitude, long-endurance (HALE) unmanned air vehicles (UAVs) offer the potential to provide a significant role in command and control, communications, computers, intelligence, surveillance, and reconnaissance architecture envisioned for the Department of Defense and offer capabilities within the commercial sector, enabling new initiatives in environmental surveys, agricultural studies, communication architectures, wind energy, and many other applications.

With the advent of Compass Cope, an Air Force sponsored program initiated in 1971 to evaluate the feasibility of creating a HALE platform, requirements for these platforms have evolved from an endurance exceeding twenty-four (24) hours at an altitude of 55,000 feet to an endurance up to five (5) years at altitudes possibly exceeding 100,000 feet.

There is a need for reduced wing loading to increase the platform endurance. One way of doing this is to mitigate the effects of gust conditions, therefore reducing the design load requirements, resulting in lighter structures and a reduced structural mass fraction, which results in a lower wing loading.

Prior active approaches do not offer the degree of shape control, or the degree of tailorability in structural design to control the aerodynamic loads specific to the HALE aircraft application. The weight of the active approaches also precludes their use in HALE platforms due to the increased weight and complexity of the actuation and control systems. Furthermore, the passive approaches described in prior art typically result in a linear deflection curve, whereas the currently claimed approach offers a highly nonlinear, stepwise response to aerodynamic loads in addition to a high degree of tailorability.

The requirements associated with HALE aircraft design and performance place a premium on several factors including; aerodynamic efficiency, structural efficiency, propulsive efficiency, and most importantly, reliability. Structural efficiency is a key element in achieving the extreme endurance initiatives, which is highlighted in the performance of the HELIOS UAV, developed for NASA, which demonstrated successful flight at an altitude of 96,000 feet with a maximum wing loading of one pound per square foot. Future applications capable of achieving flight duration of five years or greater will likely possess wing loadings of 0.7 pounds per square foot (lbs/ft$^2$) or less making them more susceptible to atmospheric turbulence or gust loads when ascending or descending through the troposphere.

Current design approaches incorporate gust load estimations in the structural sizing, resulting in higher structural weights and potential structural failure if unpredictable flight conditions are experienced. Introduction of innovative methods for offsetting the effects of gust loads to significantly reduce the structural mass fraction by reducing the maximum design loads and enabling the desired wing loadings is highly desired. As a result of these long-term goals, opportunities exist to identify and develop unique solutions for reducing the structural mass fraction for HALE platforms.

The overarching goal of current programs is to enable higher altitude or longer endurance flight times of HALE aircraft. There are several ways this can be accomplished (inflatable structures, tensegrity, advanced composites, etc.), but for the passive adaptive approach the objective is to use traditional composite design approaches coupled to a tailored aerodynamic response to limit the aerodynamic loads that the aircraft will experience. For the case of HALE aircraft, the primary loads driving the structural design space are the gust loads experienced during ascent through the troposphere. Once the aircraft reaches cruise altitude above the stratosphere in the troposphere, the thermal conditions minimize the vertical gusts that aircraft would otherwise experience within the troposphere. The effect of the gust load is to increase the ultimate design loads that the HALE structure must withstand, therefore increasing the sizing of the individual structural components and increasing structural weight. By controlling the shape of the aircraft wing in the event of a gust, the effect of the gust loads can be alleviated, therefore decreasing the ultimate design loads driving the structural sizing and resulting weights. Shape control can be accomplished in one of two ways, passively or actively, but for the case of HALE aircraft, the needed low wing loadings further preclude the use of active systems due to the complexity of the control systems required and the added weight of distributed actuators for shape control. The ultimate approach to controlling gust loads and shape change is a highly-tailorable, passive approach that avoids the challenges and weight associated with controls, electrical wiring, and actuators in an active design that is highly susceptible to breakdowns in the active actuators.

HALE aircraft are a relatively new breed of aircraft that until recently, have not received the level of attention and challenging design requirements as those associated with other aircraft. When comparing the wing loadings of commercial aircraft (W/S=18.7 lbs/ft$^2$), Boeing's CONDOR HALE aircraft (W/S=2.3 lbs/ft$^2$), the U2 spy plane (W/S=4.71bs$^2$), and AeroVironment's HELIOS HALE aircraft (W/S=0.9-1.1 lbs/ft$^2$), a wing loading target of 0.6 lbs/ft$^2$, are pushing the limits of materials and structure design; therefore, for controlling loads are needed. In response to the VULTURE program and the need to further reduce structural mass fraction, the key teams involved are focused on new structural concepts rather than controlling loads. Examples of their approaches include inflatable structures, tensegrity ("sticks and string"), or advanced three-dimensional composites. Each of these approaches is valid in its own right, but each one introduces a complexity in structure design and fabrication that may not result in the desired weight savings; however, little information is available regarding the scope of the work and the details of the various approaches due to the competitive nature of these projects.

Active Morphing Wings

Active morphing wings means a wing that uses some form of internal mechanical force, such as a gear, motor, or similar device, to move the wing structure from one position to another. Reduction of structural mass fraction is the goal of passive adaptive morphing applied to HALE aircraft and for improved performance (i.e. speed, endurance, etc.). Active morphing, however, is typically focused on performance and not reduction of structural mass fraction.

U.S. Pat. No. 4,796,192, issued on Jan. 3, 1989 to Lewis, discloses a method to reduce the bending moment load on aircraft wing root structures. The disclosed method uses measurements of the aircraft flight parameters and control surface configuration to calculate a theoretical value of the bending moment load on the wing root. If this theoretical value is above a predetermined threshold, a flight computer will command motors to cause the upwards deflection of the outboard ailerons to reduce the actual bending moment load on the wing root. The use of a flight computer, sensors, and automated actuation of ailerons adds mass and complexity to the aircraft, while the claimed reduction of mass and complexity from the wing root structure provides for an ultimate reduction in aircraft gross weight. However, the control system and materials used are still significantly heavier than the currently presented devices and does not allow for a significant shape change in the wing design during flight.

The general concept of rotor blades that passively adapt to the incident wind loading is not new. Mechanisms that adjust blade angle of attack in response to the thrust loading were quite popular in the early days of the modern wind energy push of the late twentieth century. Approaches to and objectives of various systems are quite varied. One effort regulated power with a centrifugally loaded mass on an elastic arm. Twisting to feather in response to increasing winds is a known potential means to reduce the dynamic loading on the blades, and hence the rest of the system. Load reductions have been demonstrated by linking a pitch control system to flapwise blade loads using simple integral control and standard rotor blade theory. Yet all of these methods are not as successful in alleviating gust loads, either due to the complexity of the design or the failure to establish a significant reduction in the mass fraction of the wing.

Morphing Skins

Morphing skins must transition between rigid substructures, where they are connected, and the high-strain morphing zone. This requires the skin to transition between zero strain at the substructure to the high strain (10% or greater) in the morphing zone. Currently this transition takes place over a short length, and there is a large discontinuity in stiffness where the attachment zone meets the high-strain morphing zone. This jump in elastic modulus creates a high-stress concentration along the interface and leads to localized failure after a few cycles of activation.

Passive Morphing Wings

Some attempts at designing a morphing wing use passive geometry adaptation in an attempt to alter the wing design based on loading and/or deformation of the wing tips. U.S. application Ser. No. 10/551,406, publication number US 2007/0036653, published on Feb. 15, 2007 and filed by Bak et al. describes a design concept by which the power, loads and/or stability of a wind turbine may be controlled by typically fast variation of the geometry of the blades using either active controls, such as actuators, or passive controls which arise from the changes in the load or deformation of the blades. Changing the shape of the wing by a combination of the two methods is possible. The passive controls comprise oblique changes in the geometry obtained from influence of blade deformation, e.g. a change in effective camber from blade flap-wise bending or from pressure fluctuations from the interaction with the flow. Bak has a bend/twist coupling, which means that the deflections are going to be limited via the stiffness of the structures while maintaining the same load path. In the currently disclosed passive design, there is a changing of the camber of the wing, but not twisting the wing. There is a higher degree of tailorability (i.e. mitigate multiple gust conditions due to the stepwise, non-linear response that can be tailored both spanwise and chordwise). The bend/twist coupling of the Bak approach is a linear deflection response.

U.S. Pat. No. 6,161,801, issued on Dec. 19, 2000, to Kelm et al., discloses a method to reduce the bending moment on wings. In this method, wing control surfaces are placed in a certain configuration during takeoff and landing phases to reduce the lift generated by the outboard portions of the wing, consequently reducing the bending moment on the wing. This method expressly neglects sensing the aircraft flight parameters, and instead assumes that the aircraft will encounter flight conditions generating aerodynamic loads in excess of the wing bending moment threshold. This event is precluded by the takeoff and landing configurations. This method does not require an additional flight computer, sensors, or automated flight surface control, and this method does not require rapid sensing of the occurrence of a wind gust and rapid actuation of control surfaces to try to instantaneously counteract a wind gust as it occurs. This is purely flight controls and not really an "adaptive" wing. They are simply setting control surfaces in a position to offset loads towards the tip of the wing and increase the lift at the root to reduce the maximum root bending moment.

U.S. Statutory Invention Registration No. H2057 H, published Jan. 7, 2003, issued to Veers et al., discloses an entirely passive method of reducing the aerodynamic load on a wind turbine blade. The disclosed blade is made of a composite in which the fiber orientation causes the blade to twist around its spanwise axis if it is bent about its chordwise axis, a behavior known as "bend-twist coupling." As the lift force generated by the blade increases, that force will cause the blade to bend outwards around its chordwise axis. The blade will then twist, reducing the angle of incidence and consequently the lift force generated by the blade. This passive system is used to control the loads experienced by the blade.

United Kingdom Patent Application No. GB 2,129,748, published on May 23, 1984, issued to Klug, discloses a passive system to mitigate gust loads on a wing. Inside the wing structure is an open channel between the upper and lower surfaces. The channel opening on the lower surface is covered by a hinged flap. During a gust event, the additional freestream velocity increases the lift generated by the wing. If this additional lift force exceeds the wing structure load threshold, the flap on the lower wing surface will open, allowing the flow to pass through the channel and into the low-pressure region on the upper wing surface. The sudden introduction of high-pressure flow normal to the boundary layer induces flow separation, consequently reducing the lift force generated by the wing.

U.S. Pat. No. 7,384,016 to Kota et al., issued on Jun. 10, 2008, discloses that a variation in the contours of a first and second compliant surface is produced by a compliant frame having a first resiliently variable frame element with a corresponding first outer surface and a first inner surface, and a second resiliently variable frame element having a corresponding second outer surface and a second inner surface. The first and second outer surfaces communicate with their respective counterparts of the first and second compliant surfaces. A linkage element having a predetermined resilience characteristic is coupled at a first end thereof to the first inner surface and at a second end thereof to the second inner surface. A frame coupler joins the first resiliently variable frame element to a support element. An actuator applies a force to the second resiliently variable frame element with respect to the support element, resulting in a corresponding variation in the contour of the first and second compliant surfaces. This active approach still requires significant actuation means and does not address the reduced mass fraction or improved performances that the currently presented devices do.

The above disclosures teach several methods to accomplish substantially the same goal: the reduction of aerodynamically induced bending moment in the wing structure. Between the two passive methods, Veers & Klug, there is a great difference in how that goal is accomplished. The "bend-twist coupling" method disclosed by Veers effects a continuous, linear geometric shape change. The greater the load, the more twist the blade will exhibit, consequently decreasing the load and decreasing the degree of twist. The decreased twist will allow greater load, which will again increase the degree of twist. The continuous nature of the relationship between load and twist allows for oscillation between over and under-compensating the load.

Klug discloses a discontinuous, stepwise response to aerodynamic load. A certain pressure value will pull the flap open, allowing the high-pressure flow from under the wing to separate the boundary layer on the upper surface. This will suddenly reduce the lift generated by the wing. After the gust event, the flap will close, allowing the flow to reattach and quickly recover the lift generated by the wing. Since the flap opens at only one pressure value, and the pressure required to close the flap is much higher, there is no risk of aeroelastic oscillation. This method is not without shortcomings. Separating the flow between channel openings upstream of the outboard ailerons and control surfaces may render these control surfaces ineffective. The system is also at greater risk for failure as the channels can clog with airborne debris or ice accretion from captured condensation or rainwater.

Dynamic Modulus Resins

Dynamic Elastic Modulus Resins (DMR) are resins whose elastic modulus changes with a change in temperature of the resin. One such DMR is Shape Memory Polymer (SMP). Shape memory materials were first developed about twenty-five (25) years ago and have been the subject of commercial development in the last fifteen (15) years. Shape memory materials derive their name from their inherent ability to return to their original "memorized" shape after undergoing a shape deformation. There are principally two types of shape memory materials, shape memory alloys (SMAs) and shape memory polymers (SMPs).

SMAs and SMPs that have been pre-formed can be more easily deformed to a desired shape above their glass transition temperature ($T_g$). The SMA and SMP must remain below, or be quenched to below, the $T_g$ while being restrained in the desired shape to "lock" in the deformation. Once the deformation is locked in, the SMA, because of its crystalline network, and the SMP, because of its polymer network, cannot return to a relaxed state due to thermal barriers. The SMA and SMP will hold their deformed shapes indefinitely until they are heated above their $T_g$s, whereupon the SMA and SMP stored mechanical strain is released and the SMA and SMP return to their pre-formed, or memory, states.

There are principally two types of plastics, thermoset resins and thermoplastic resins, each with its own set of unique characteristics. Thermoset resins, for example, polyesters, are liquids that react with a catalyst to form a solid, and cannot be returned to their liquid states, and therefore, cannot be reshaped without destroying the polymer networks. Thermoplastics resins, for example PVC, are also liquids that become solids. But unlike thermoset resins, thermoplastics are softened by application of heat or other catalysts. Thermoplastics can be heated, reshaped, heated, and reshaped repeatedly.

SMPs used in the presently disclosed method and devices are unique thermosetting polymers that, unlike traditional thermosetting polymers, can be reshaped and formed to a great extent because of their shape memory nature and will not return to a liquid upon application of heat. Thus, by creating a shape memory polymer that is also a thermosetting polymer, designers can utilize the beneficial properties of both thermosetting and thermoplastic resins while eliminating or reducing the unwanted properties. Such polymers are described in U.S. Pat. No. 6,759,481 issued to Tong, on Jul. 6, 2004, which is incorporated herein by reference. Other thermoset resins are seen in PCT Application No. PCT/US2005/015685 filed by Tong et al. on May 5, 2005, and PCT Application No. PCT/US2006/062179, filed by Tong, et al. on Dec. 15, 2006, of which both applications are incorporated herein by reference.

Unlike SMAs, SMPs exhibit a radical change from a normal rigid polymer to a flexible elastic and back on command. SMA would be more difficult to use for most applications because SMAs do not have the ease in changing the activation temperature as do SMPs, and SMAs are limited to low maximum strain values. SMAs would also have issues with galvanic reactions with other metals, which would lead to long-term instability. The current supply chain for SMAs is currently not consistent as well. SMP materials offer the stability and availability of a plastic and are more inert than SMAs. Additionally, when made into a composite, SMPs can offer similar mechanical properties to that of traditional composites used in the aerospace industry. SMPs and SMP composites can also achieve high strain levels. Throughout this disclosure SMP and SMP composites are used interchangeably as each can be replaced by the other, depending on the specific design requirements to be met.

Composites

The term "composite" is commonly used in industry to identify components produced by impregnating a fibrous material with a thermoplastic or thermosetting resin to form laminates or layers. Generally, polymer composites have the advantages of weight-saving, high-specific mechanical properties and good corrosion resistance, which make them indispensable materials in all areas of manufacturing. Because SMPs are resins, they can be used to make composites, which are referred to in this application as SMP composites.

Advanced composites, containing continuous fibers dispersed in a resin matrix material, are widely used in aerospace, sports equipment, infrastructure, automotive, and other industries, both as primary and secondary load-bearing structures. These composite materials derive their excellent mechanical strength, stiffness, and other properties from a combination of the resin and reinforcement fibers used. The addition of reinforcements such as continuous fiber, fiber mats, chopped fibers, fiberglass, nanoparticles and other similar material is known. Even with nanoparticles, like carbon nanotubes and carbon nano-fillers, a small amount of these nano-fillers could dramatically alter the properties of a matrix resin.

Composites have excellent mechanical properties. Like any material, they will yield or fail when limits are exceeded. These failures are prevented by physically limiting the load and displacement that the buckling members experience and by choosing a resin that is tough enough to survive with these particular limits.

This problem is of great concern because of the widespread and intensive use in modern society of polymers and polymer composites in product components. Traditional approaches to increasing the reliability of polymeric based components and products have included a focus on suitable design enhancements and the use of incrementally improved plastics.

Buckling Members and Structures

Structural members will exhibit buckling when compressed. Characterized as a failure mode, buckling is the tendency of compressed beams to suddenly exhibit large scale deformations under a load equal, or less than that, which initiated the failure. Beams loaded in tension do not exhibit buckling and can support greater loads than the same beam loaded in compression. For this reason, load-bearing structures have historically been designed to avoid buckling by bearing loads in compression. Aircraft structures are specifically designed in many cases to carry compressive loads without buckling. In most cases this is more important than tensile loads.

A post-buckled beam, which is a beam that has been sufficiently compressed to induce buckling, will exhibit greater deformation than the same beam in a non-buckled state under equal load. A post-buckled beam exhibits greater strain per stress than a non-buckled beam. This behavior does not facilitate the support of loads by a structure.

One of the few designs that actually utilizes buckling in a structure is described in U.S. Pat. No. 5,409,200 issued on Apr. 25, 1995 to Zingher et al. Zingher describes a thin sheet of metal which is pattern-folded and joined to produce a ray of compression springs. Each spring will exhibit constant force characteristics over a useful range of deflections to allow the array to apply nearly constant specified forces to closely spaced items which may be of varying size or height. As the springs are loaded from a relaxed state the rate of force increase per unit of increased deflection is initially high, tapering off to nearly zero (0) force increase with subsequent increases in deflection. This region of minimal force increase per unit of increased deflection (i.e. a near constant force band) extends over a useful range of deflections. The springs are self guiding and balanced, producing no lateral force on a perpendicularly applied load.

A second embodiment utilizing buckling is disclosed in U.S. patent application Ser. No. 11/407,535, publication number US 2007/025821 filed by Son et al. on Apr. 20, 2006. Son describes that the elements of the structure can be made to buckle or collapse so as to give the user the sensation of a "click" or "snap" upon the compression of the sensor. That function is valuable to allow the user to have a tactile confirmation of a completion of the process of button activation. It is achieved by providing the geometric elements of the compressible dielectric structure with limited column strength or a built-in buckling means as described later. This limits their column strength and encourages their collapse upon reaching a threshold pressure. Upon compression of the top surface by the user, the strips initially compress without collapse under light loads, but then collapse under higher load and the surface of the device buckles to one side after exceeding a predetermined threshold value. That value is easily adjustable by varying the properties of the material and the dimensions of the strips. Upon collapsing, the structure provides for instant movements of one surface closer to the other that can be used to provide a perception to the user that the button is fully compressed and no further compression is needed or useful.

While the design elements of Zingher are designed to buckle they are also designed to provide no support to any structural members causing them to buckle. This lack of support is the principal reason why engineers and architects do not design structural elements to buckle.

Critical to the performance of the springs in Zingher is that the spring of force must be produced by the entire length of the side member or leg and not concentrate to a small portion of the leg. To achieve this it is imperative that the profile of the legs be a gradual arc with no abrupt form changes or defects in the active region. Prior art springs could not simultaneously achieve a dense array and near constant force over a wide deflection. An array of the little washers can provide large density but only in a range of near constant force. A common tape measure contains a coiled metal tape which may be considered a spring with a constant tensile force over a very wide range of extension. This spring is incompatible with the dense array. Still other designs for buckling beam springs are not compatible with an array sheet structure and not compatible with fabrication like a printed circuit.

The exploitation of beam buckling behavior has enabled micro scale devices, tactile switches, and constant force springs. In none of these applications does the buckling beam, at any point, resist a load except with deflection. These applications exploit the fact that buckled beams exert a smaller load than the same unbuckled beam; the unbuckled beam's resistance to load is never required or utilized. All of the previously mentioned documents teach applications where the dimensions, deformations, and loads encountered are small in scale.

The exploitation of buckling beam behavior would incorporate the support of load by the member in the unbuckled state; the member would meaningfully contribute to structural integrity. The same member could then be buckled to provide constant spring back force, a sudden change in resistance to deformation, or allow deformation above a certain magnitude of load. This structure would be beneficial because of the incorporation of buckling and non-buckling phases.

Also, the loads, deformations, and dimensions would be far greater than those encountered in the background art.

Thus, while the prior art has proposed systems for reducing wind gust loads, such systems have not come into practical use. That is because the majority of the commercially viable systems have all been intended to actively sense and counteract the effects of a wind gust as it occurs so as to reduce the actual instantaneous wind gust loading; operation in that manner places very high demands on such a system in actual practice. Namely, since the wind gusts causes very rapid and sudden variations in the loads applied to the wings, the sensors must react very rapidly and precisely, and the active measures such as actuation of control surfaces to counteract such wind gusts loads must be similarly rapid.

One primary advantage of a morphing platform would be the increased cost effectiveness of aircraft through eliminating the need for multiple, expensive, mission specific aircraft. However, from current trends in this research area, it is clearly evident that the practical realization of a morphing structure is a particularly demanding goal with substantial effort still required. This is primarily due to the need of any proposed morphing airframe to possess conflicting abilities to be both structurally compliant to allow configuration changes but also be sufficiently rigid to limit aeroelastic divergence. The currently disclosed devices present solutions to all of the problems mentioned.

SUMMARY OF THE INVENTION

The present invention provides an apparatus, system, and method of passively altering the geometry, size and shape of an airfoil member. The airfoil member includes a geometric morphing device, which has a selectively moveable member. The moveable member has an exterior wall and multiple states. The exterior wall includes a layer with one or more fibers embedded therein. The exterior wall controls size, shape, and expansion ability of the geometric morphing device.

The presently claimed device has several advantages over existing airfoil member altering devices. One advantage is that the invention provides an airfoil member that is capable of changing its shape while maintaining a low mass fraction thereby minimizing the weight penalty. The versatility of the presently claimed device also allows the shape of the airfoil member to morph in a non-linear manner. The ability to significantly change in shape provides lower mass fractions with a potential for increased application versatility and increased flight control throughout a flight envelope.

Thus the presently claimed device is a passive system to mitigate aerodynamic loads. The system mitigates the aerodynamic loads resulting from gust conditions by using the force from said aerodynamic load to effectuate nonlinear deformation of the aerodynamic body. The nonlinear deformation of the body changes the aerodynamic loading to a more preferred state. The body maintains the deformed state until conditions are such that the body can return to its original shape without experiencing the aerodynamic load which initiated deformation.

The nonlinearity of the deformation provides resiliency to aeroelastic oscillations, which could result from overcompensation to the aerodynamic load conditions. The use of the aerodynamic loads as the stimulus and means for deformation provides for excellent response time of the system.

The presently claimed device, together with further objects and attendant advantages, will be best understood by reference to the following detailed description, taken in conjunction with the accompanying drawing.

DETAILED DESCRIPTION OF EXEMPLARY EMBODIMENTS

Figure 1A:
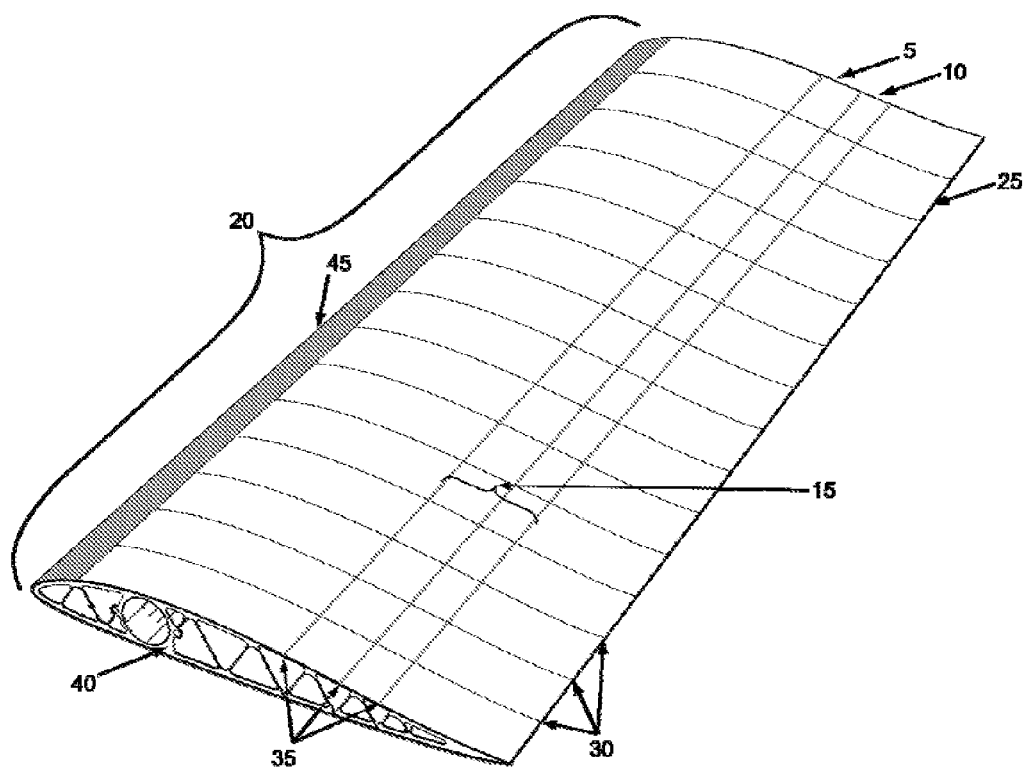
FIG. 1a is a perspective drawing showing the different sections of a morphing wing (20), with selectively morphing sections (35).

Embodiments of the present disclosure are directed to an adaptive structure which incorporates a trailing edge structure using members designed to provide a critical buckling load, which occurs because of aerodynamic conditions, just beyond the design maneuver loads, resulting in a stepwise response to gust loads. High altitude long endurance (HALE) aircraft would use this design to permit the structure to maintain its flight geometry unless exposed to a dynamic load such as a wind gust, where the structure will respond by reducing the camber and relative angle of attack when the buckling members are loaded beyond their critical load. Other aircraft, wings, or similar aerodynamic structures would use this claimed device in a similar manner to improve performance.

Structural deflections can be tailored in the chordwise and spanwise direction or both by introducing multiple regions, each consisting of a buckling member with a specific critical load. In the event of a smaller gust load, only a portion of the chordwise structure will deflect. As gust loads increase, more of the regions will permit deflection, resulting in a larger shape change and a more pronounced response to larger gust loads. This graded response is done to minimize the aeroelastic response of the structure by maintaining relatively constant lift during a gust event. Structural deflections will also be limited through stopping members to prevent overstressing the buckling members for improved fatigue and reliability characteristics.

Gust Conditions

The design criteria that passive adaptive, HALE aircraft wing design should meet are listed below with brief descriptions of their application: Magnitude of response: design must have the potential to enable deflections of the airfoil geometry that result in changes in the pressure distribution over the wing that are great enough to shed excess load; Non-linearity of response: design must have the potential to result in a non-linear deflection response, so that the airfoil shape remains consistent during normal flight loads; Reliability: the design must be able to generate a response whenever critical loads are encountered; Repeatability: the deflection resulting from design must result in predictable airfoil configurations whenever the response occurs; Ability to be fabricated: the design should be able to be fabricated using a low-cost, repeatable process; Weight: design must be as light as possible, as the overall goal is a reduction in structural sizing to reduce overall vehicle weight and increase endurance; Quickness of response: the response of the system must occur nearly immediately at the onset of critical loads; Ability to maintain a smooth wing surface: the design must allow the airfoil to change shape, but smooth transitions are preferred to maintain acceptable levels of aerodynamic performance; Simplicity: simpler designs that satisfy the design requirements are preferred over more complex designs, because they will contribute to higher reliability and repeatability, lower weight, ease of fabrication, and lower costs through all aspects of the project; Cost: solutions that cost less to develop, fabricate, and integrate are preferred.

The only adaptive approach that remotely resembles the attempt at mitigating gust loads through a passive adaptive design is the use of asymmetric, unbalanced composites to introduce bend twist coupling into the structure. The design principle that these structures were built on was the ability of the unbalanced laminates, when deflected upward, would also twist downward to reduce lift and restore the bending loads to their original state, therefore preventing loads from diverging and leading to structural failure or overstressing. The passive adaptive structures approach being claimed offers a distinctly different solution to offsetting the effects of gust through extreme tailorability, controlled deflection relative to the previously mentioned approach, and a non-linear, stepwise response to avoid introducing secondary structural dynamic effects. Ultimately, the key advantages are the degree of tailorability, lightweight passive solution, and the non-linear response characteristic of the buckling members used to transfer load. The result of these key differences is the ability to drastically reduce the time varying loads (such as gust) therefore reducing design loads requirements and structural weights and providing for a high degree of tailorability. Thus the approach developed in the invention registration does not limit or affect the scope of the currently disclosed device.

This application claims the development of a passive adaptive structure with the capability of alleviating loads imposed by gust events or other aerodynamic conditions on a HALE aircraft structure with the end result of reducing the structural mass fraction of HALE aircraft. Those of skill in the art will understand that the design specifics of a wing will vary with every aircraft depending on the flight environment and atmospheric turbulence conditions expected; understanding the loading conditions for developing structural configurations of the wing; evaluate geometric shape changes that produce the necessary aerodynamic response to gust loads; developed structural configuration that enables desired geometric shape changes; estimate structural weight impact through introduction of adaptive technology; outlining requirements for elastic skin and identified materials for potential skin solution; fabricating a prototype and evaluate performance against design studies; and understanding the intended mission profile and the geometric shape changes necessary to offset the effects of maximum gust loads in the load spectrum.

Due to the desirable low wing loading and resulting flexible nature of HALE unmanned aerial vehicles (UAVs), it is imperative to accurately represent the time-varying load conditions in order to effectively develop structural technologies that offset the effects of these dynamic loads. Any response inherent in the structural design will also introduce secondary dynamic loading effects due to the fluid/structural coupling, which must also be understood when engineering a designed response to avoid diverging deflections leading to structural failure or loss of control.

Because of the unpredictable nature of atmospheric turbulence and wind gusts, the Federal Aviation Administration (FAA), in the Federal Aviation Regulations (FAR) Part 25, has established a set of airworthiness criteria that require a careful study of the gust environment that aircraft may experience to determine the maximum design load requirement. Unlike conventional aircraft, which are commonly designed to withstand high maneuver loads, HALE aircraft loads will be dominated by the turbulence and gust events experienced during ascent and descent through the troposphere where thermal gradients exist due to heating of the earth's surface and thermal convection into the atmosphere. These same loading events do not occur within the stratosphere as a result of the temperatures rising as altitude is increased from the troposphere. In any event, it is important to consider all of the time-varying loading conditions experienced in flight to determine the extreme loading cases, including the following: in flight maneuver loads; turbulence/gust loads (discrete and continuous, symmetric and asymmetric); ground and maneuver controls loads; engine imbalance; and repeated loads generation leading to structural fatigue.

It is also important to recognize that it is difficult to predict and plan for every potential event; therefore, it is possible to couple this passive approach with an active response technique. Coupling both active and passive techniques may offer reduced requirements for each, adding redundancy and reliability to the system.

In the case of HALE platforms, gust loads will represent the primary extreme loads the aircraft may experience. Following the analytical equation provided in FAR Part 25 for computing gust loadings, one can evaluate the options for geometric changes in response to such events.

$$n = 1 + \frac{K_g a U_e V_e}{498(W/S)} \qquad (1)$$

where, $$K_g = \frac{0.88\mu}{5.3 + \mu} \qquad (2)$$

and, $$\mu = \frac{2(W/S)}{\rho c a g} \qquad (3)$$

where
a=(dC$_L$/dα)
U$_e$=equivalent gust velocity (ft/sec)
V$_e$=equivalent airspeed (knots)
K$_g$=gust alleviation factor
c=geometric chord
ρ=atmospheric density While these equations will provide the starting point for any analysis of the design, the final analysis used will most likely differ from this depending on the in-flight conditions expected.

Equation (1) demonstrates that the gust load correction is directly proportional to the lift curve slope of the wing. The ability to alter the lift curve slope in the event of a gust offers the potential to significantly reduce the maximum design loads for a HALE platform, therefore reducing the structural mass fraction.

By incorporating passive adaptive wings to alleviate these gust loads there is a direct reduction in the structural mass fraction and wing loading. The passive adaptive wings utilize a wing structure that changes through buckling members at specific "stepwise" inputs. These inputs are the result of gust loadings. In order to design the wing structures properly it is important to develop a baseline configuration for the design environment and specify what gust loadings will be the "stepwise" inputs.

Gust loads are usually considered to be the result of a change in angle of attack caused by the component of the gust velocity orthogonal to the flight path. These gust velocities can be categorized into two types, lateral and vertical gusts.

The change in lift force due to vertical gust velocity and a lateral gust velocity is shown in Equation (4) and Equation (5) respectively.

$$\Delta L = \frac{\rho}{2} UVSC_{L\alpha} \qquad (4)$$

$$\Delta L = \frac{\rho}{2} (2UV)SC_L \qquad (5)$$

Where: U=Gust velocity

Note the main difference between these two expressions is the use of $C_{L\alpha}$ compared with $C_L$ for steady-flight. The change in lift associated with the vertical gust velocities and lateral gust velocities are usually combined with the root-sum-square addition due to the probabilistic nature of the atmosphere. Likewise, Equation (6) calculates the ratio between the total lift and lift due to vertical gust alone at any given probability level.

$$\sqrt{1+[2(C_L/C_{L\alpha})^2]} \qquad (6)$$

The change in lift is also affected by the motion of the airplane. Maximum gust velocities never occur instantaneously. As the aircraft is subjected to the gust profile it deforms and acquires motion. The applicable aircraft motions associated with vertical gust velocities are the pitch and plunge motions. The pitch motion refers to the aircraft's natural pitch stability which compensates for the gust velocity changing the angle of attack. The plunge motion is the aircraft's tendency to shift vertically in the direction of the gust, which reduces the net gust velocity felt by the aircraft. An aircraft's motion in response to a lateral gust is similar to those in response to a vertical gust. The alleviation for the plunge motion is identical for the vertical gust and the lateral gust; however, the pitch motion varies. For the pitch response to a lateral gust, the incremental change in lift is acted at the center of gravity (c.g.) of the aircraft, as opposed to the aircraft aerodynamic center of pressure for the vertical gust.

If a gust profile acts continuously with respect to time, it is generally referred to as turbulence. This differs from a single pulse, which is referred to as a discrete gust. Both turbulence and gust are isotropic in the atmosphere. This means that a vertical gust profile will have the same general characteristics as the lateral gust profile and that it traverses in various directions through the same patch of turbulence. For individual gusts, this means that the gust has an equal chance of occurring as a vertical or lateral gust and can be found in any direction.

Typical gust profiles for discrete gusts include the "sharp-edged" and the (1-cosine) gust profile. The "sharp-edged" gust is a step response that results in an instantaneous maximum gust velocity at an instant in time. A "sharp-edged" gust is not representative of gusts as it neglects boundary regions that allow the gust to build in magnitude. It also results in a higher acceleration increment than would actually occur. The (1-cosine) gust provides a simple, more realistic model of the variation of the gust velocity in that boundary region. The (1-cosine) gust profile has a gradual increase in gust velocity that follows a bell-curve shape.

A typical value for the gradient distance parameter is 12.5 times the mean chord length taken from analysis of flight data. This analysis also allowed for a correction factor or "alleviating" factor, $K_g$, to be deduced. The equation for the alleviation factor is given in Equation (2). This correction factor is applied to the normal acceleration increments derived for a sharp-edged gust analysis. Thus, through experimental correlation, the (1-cosine) discrete gust can be extended to the easier "sharp-edged" gust analysis through the use of the alleviating factor $K_g$. It should be kept in mind that the assumption of the gradient distance is in reality a variable for every design. Other values for this distance could result in higher incremental accelerations. The tuned gust approach offers a way of addressing this issue, but it is not discussed here.

This section focuses primarily on the technical principles of representing turbulence or gust conditions. It neglects a number of the other technical principles associated with structures, buckling members, composites, and aeroelasticity that must be considered.

As previously mentioned these equations and discussions provide the basis for determining the optimal structure for a passive wing response. However, these equations are only the basis and further detailed study would be needed to fully optimize the wing design for the operating conditions expected and aircraft performance required.

Morphing Wings

Morphing, or the ability to change shape, presents the opportunity to alter geometry with the specific goal of improving performance or modifying function. In the case of aircraft wings, the ability to morph the geometry offers the potential to manipulate performance parameters such as range, endurance, and speed as well as introduce multirole capability in a single aircraft system. Morphing systems are classified in one of two ways, either global morphing where large shape changes result in drastic alterations in performance, or local morphing where small shape changes are used in flight control or as flow effectors. Active morphing, which implies the use of internal actuation, is typically used in both global and local shape change while passive morphing, which adapts to external environmental loads without the use of actuators, is typically focused on more local shape change solutions. It is the aim of the present disclosure to describe the use of passive adaptive morphing structures, active morphing structures, and combinations thereof to manage these aerodynamic loads.

In the case of aircraft design, it is common that the design will be focused on either a specific flight regime (e.g. cruise) or a compromise between multiple flight regimes. In either case, a compromise in performance is made to enable the narrow performance targets defined for each aircraft application. The result is an aircraft design that permits a narrow range of operational capabilities. Operation outside the defined window of performance typically results in a significant reduction in efficiency. Introduction of morphing technology offers the potential to open the window of performance for any aircraft, permitting efficient operations at multiple flight regimes or widely varying performance metrics such as maximum speed or endurance. As an example, traditional long-endurance aircraft will possess very long, slender wings (high aspect ratio) to minimize induced drag while a fighter aircraft uses short, stubby (low aspect ratio) wings for high speed performance as well as extreme maneuverability. If morphing were to be implemented, the potential exists to create a single aircraft that can operate in both modes. For long-endurance flight (loitering in a single location for observation) the wings would be long and slender, but then change shape to short and stubby for high speed ingress/egress (to deliver goods or close in air support) into/from a hostile location.

In designing a morphing structure, several components must be considered; sensing, actuation, substructure, materials, morphing skins, skin activation, and skin attachment as a complete system to ensure the most efficient design be achieved. The focus of any morphing design addresses the need to achieve specified geometries, each corresponding to a set of flight conditions and aerodynamic loads while minimizing the power for actuation, power for skin activation, and overall morphing system weight relative to what a baseline, fixed wing solution would provide. To enable such designs, advancements in materials, design methodologies, and computational tools are required to achieve a fully optimized system. In many cases, these advancements are still in progress to support future morphing designs.

Further implementation of morphing solutions has also resulted in the use of passive adaptive structures to minimize the weight penalty of introducing adaptivity with an ultimate goal of reducing the structural mass fraction of the air vehicle leading towards increased endurance. In this case, the requirements for such a solution were driven by the need for high-altitude, long-endurance (HALE) aircraft to achieve endurance metrics approaching flight durations of years rather than days. Reaching such an objective required a reduction in the overall system weight, including that of the structure, to minimize the energy for such an aircraft to remain aloft. In this application, the passive adaptive morphing solution was focused on permitting localized adaptation of the wing structure, in response to the external aerodynamic loads, to offset the effects of gust loads encountered by the aircraft, hence, reducing the maximum design loads for the wing structure. This has the effect of reducing the sizing of the structural components, leading to a reduced structural mass fraction and increased endurance of the aircraft.

Active Morphing Wings

As used throughout this application the specific examples and embodiments presented are for the specific design applications noted. Due to the uncertainty of operating conditions, each model aircraft's wings are custom designed for the flight conditions expected. The designs discussed and disclosed herein are for the operating conditions discussed, however, the design principles could be used to make morphing wings for aircraft of different size, scale, and scope than those discussed and their application should not be thought of as limited to the size, scale, and scope disclosed. As each wing must be designed for its specific environment, the principles disclosed in this application should be used by those of skill in the art in the design of the structural elements. It is important to note that, no single structural design will be useful for all aircraft and each wing design must take into consideration the performance requirements of the structure and the conditions the structure is expected to operate in.

Wing Skin Overview

Use of shape memory polymer (SMP) as the wing skin allows for the movement of a seamless skin to morph upon command. This is because of the ability of the SMP to withstand strains of at least 125%, and up to 400% or more. SMP is attached between the trailing edge and the main spar. The ribs and distributed honeycomb support are used to maintain the shape of the airfoil when the skin is in the activated state. When active morphing is required, the skin is activated and stretched or contracted. This allows for a seamless wing.

In one embodiment a seamless piece of SMP is attached to the support structure between the trailing edge and the main spar. The ribs of the support structure are used to maintain the shape of the airfoil when the SMP skin is in the activated, or soft and pliable, state. When active morphing is required the skin is activated and the support structure moves to stretch or contract the skin as desired. Other methods of attaching the skin to wing structure include bolts, adhesives, screws, clamps and other similar means.

Wing Skin

The first wing skin fabrication process involved gel-curing a neat Veriflex™ sheet, and then wrapping it around a sheet of non-porous Teflon® before curing the part completely. There were a number of problems associated with the process, most of which stemmed from the difficulty of manipulating a gel-cured Veriflex™ sheet. At the same time, testing was conducted integrating Nichrome heating wires into Veriflex™, and found that the material was prone to tearing when it was stretched. This lead to the development of improved Veriflex™ formulations and a composite made with Veriflex™ resin and high-strain fabric reinforcement (HSFR). The HSFR could stretch easily with the Veriflex™ while providing the tear resistance that was now required for the wing skin.

A variety of new formulations of SMP were developed and large sheets were fabricated for testing and initial trials on the aluminum structure to be fabricated.

The design developed relies on a styrene-based SMP skin that was not optimized for the morphing aero structure application. The primary focus of this design was to tailor the SMP skin material for use on the morphing wing prototype. The first attempt at modifying the toughness of the SMP was the addition of polyether sulfone in various weight percents. This polymer was selected for its toughness properties. Unfortunately, this polymer system settled out during cure and was not effectively incorporated into the SMP system.

Next, the design successfully incorporated Styrolux 3G55, a high impact polystyrene (HIPS) polymer, into the SMP system. The addition of Styrolux 3G55 increased the toughness of the SMP, but reduced its "cold" (below $T_g$) modulus. While the toughness properties are desired for aerospace applications, a high "cold" modulus is also desired to provide structural integrity to the skin. Therefore, alternative toughening agents were investigated that would help the SMP to maintain toughness and increase the "cold" modulus.

The use of Noryl® (Noryl® is a modified PPO alloy) for incorporation into the SMP system was investigated. The three grades of Noryl® tested were Noryl® 534, Noryl® HMC 202M, and Noryl® TN240. Noryl® is a toughening agent and should increase or maintain the toughness. Different amounts and combinations of these materials are being tested. A test matrix was developed and samples were made. Some of the combinations did not cure, therefore only the samples that cured could be tested using the Dynamic Mechanical Analyzer (DMA). The tests resulted in data showing the modulus and the transition temperatures of various formulations. By varying the type of Noryl® and the amount of Noryl®, designers should be able to vary the modulus, while maintaining a fairly close transition temperature, ranging from 60 to 80° C.

From the initial efforts of incorporating various forms of Noryl® into the polymer system, a very high cold storage modulus was obtained, but qualitative analysis identified a reduction in material toughness. This became a characteristic trend for all the formulations containing Noryl®. Further investigations identified potential high impact polymers for use as a toughening agent. These were Styrolux™ 656C and Styron™ 1115NT.

Samples of SMP containing a specific percentage of the two new materials were formulated, tested and compared to the baseline formulation of 30% HIPS developed. DMA results presented a large improvement in cold storage modulus over the 30% HIPS for both formulations. Based on these results, a formulation composed of 15% of both Styrolux™ 656C and Styron™ 1115NT was created and tested.

Results of the DMA made it evident that the new formulation far exceeded the performance of either component alone. These results clearly violate the rule of mixtures in which the materials performance should lie somewhere between that of the two components. A second set of measurements were taken where DMA results provided the validation needed to move forward with the formulation. Qualitative analysis also presented a drastic improvement in material toughness for the new formulation.

Through the characterization efforts, the 15% Styrolux™ 656C, 15% Styron™ 1115NT formulation has emerged as a clear leader in performance over the other formulations. This new formulation has a higher cold storage modulus and more radical decrease in storage modulus at the glass transition temperature than the 30% HIPS formulation.

Preliminary investigation of the high strain reinforced composites has shown improved tear resistance. This property is very desirable, especially concerning the activation of the SMP skin. HSFR fabric was the main reinforcement fabric considered due to its high percent strain ability. Transition temperatures, storage moduli, toughness above transition temperature, stress-strain, and strain recovery analysis were performed on these composites with one, two, and four layers of the HSFR fabric as high strain reinforcement.

Measurements such as maximum percent elongation and strain recovery were performed on the DMA. Tensile tests were conducted using an Automated Universal Testing Machine. Preliminary investigation of the HSFR composites show improved tear resistance. This property is very desirable, especially concerning the activation of the SMP skin.

All of these tests were performed using the 15% Styrolux™ 656C, 15% Styron™ 1115NT formulation. This was chosen because it was the highest performing SMP formulation currently available.

The transition temperatures and the storage moduli were determined by analyzing the modulus versus temperature graphs for each of the samples. The transition temperatures vary slightly, but not significantly. The three SMP composite samples exhibit transition temperatures of approximately 62° C., while the neat SMP sample is approximately 67° C. The slight variation could be a result of a variation in the cure temperature of the neat resin. In principle, the transition temperatures should not vary because the transition temperature is a function of the polymer resin matrix used, not the reinforcement.

The modulus decreases as the number of layers of high strain reinforcement are added, but it is not a significant reduction in the SMP composite samples. The reduction in storage modulus indicates a reduction in stiffness, but not strength or toughness. The high strain reinforcement is not a stiff fabric; therefore, it seems plausible that the moduli would decrease significantly when the fabric was added Pre-Strained Nature of Skin As a result of the inherent deflection under gust conditions, the perimeter of the airfoil will vary in length, requiring the use of an elastic skin that will permit deflection and still support aerodynamic loads. Appropriate skin configurations, fastening, and techniques are required to pre-strain the skins to prevent skin wrinkling and out-of-plane deflections. Introduction of pre-strained elastic skins into the structural design will also help to reduce or eliminate the skin wrinkling experienced as a result of the large structural deflections stemming from the inherent flexibility of lightly loaded aircraft.

Figure 21:
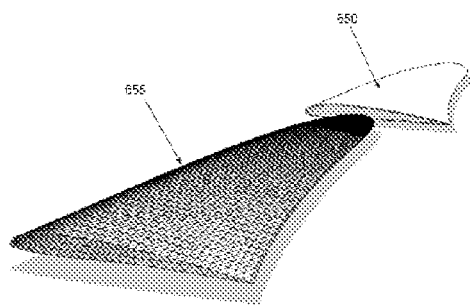
FIG. 21 is a perspective view of the wing frame (655) and a wing skin (650) designed to stretch over the wing frame.
Figure 22:
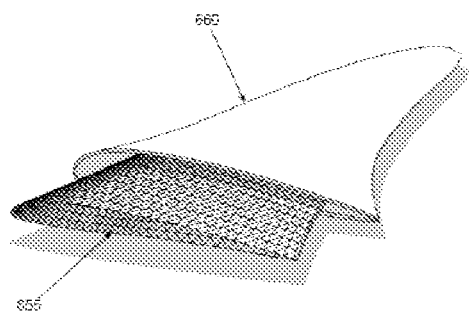
FIG. 22 is a perspective view of the wing skin (660) being stretched over the wing frame.
Figure 23:
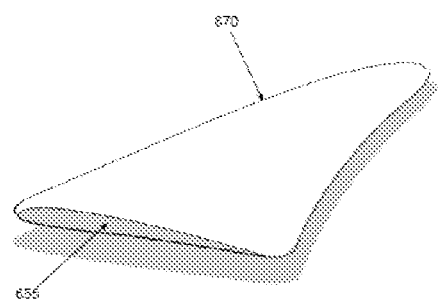
FIG. 23 is a perspective view of the wing skin (670) stretched over the wing frame creating a pre-strained wing skin.

In one embodiment, to stretch out the skin for the first time, it is preferred to use a stretch rack. By clamping two metal rods on one end of the rack, the wing skin sock can be slid onto these rods and stretched and then placed over the wing skin. FIGS. 21 through 23 show this process. FIG. 21 shows the un-stretched wing skin, 650, next to the wing frame, 655. As shown in FIG. 22 the wing skin, 660, is stretched over the wing frame, 655. As shown in FIG. 23 the wing skin, 670, covers the wing frame, 655. The final size of the wing skin, 670, is larger than the original size, 650. This pre-straining of the wing skin allows for movement of the wing skin during morphing without creating creases or wrinkles in the wing skin.

To stretch the wing skin of this embodiment, the entire rack is placed in the oven at approximately 100° C. to heat the wing skin uniformly. Once heated, the large screws at the top of the rack can be turned to move the bars apart, stretching the skin. To minimize the risk of the skin ripping, each screw was turned five times and then left to soak in the heat for another few minutes before continuing. Careful attention was paid to the tips of the wing skin as it was stretched to avoid ripping at these junctions of large stress concentrations. Once stretching is complete, the stretch rack and wing skin are taken out of the oven and allowed to cool.

Once this is completed, the skin is then placed over the un-morphed substructure. The substructure is then morphed outward to the skin to ensure that it does not travel too far, especially in the event that the skin was not stretched the full 100% elongation that was targeted. Heating pads are then wrapped around the entire structure and the wing skin attempts to shrink to its original shape. Because the substructure has been expanded, the wing skin shrinks as far as it can, conforming to the morphed airfoil shape.

In another embodiment the skin is stretched over the substructure and attached to the structure with adhesives while maintaining a stretched shape. Alternatively the skin is attached with bolts, screws, pins, etc. in the stretched state. Therefore when the structure changes shape with the skin in its activated state, the skin will still conform to the airfoil shape and maintain its aerodynamic shape.

For the other designs an elastomer based skin was used and attached it by clamping on one end, compressed the substructure and clamped the skin on the other end. Once secured, the substructure was permitted to return to its in-flight shape, resulting in a pre-defined Pre-strain in the skin.

Active Morphing Wing Sub-Structure

While the passive adaptive approach is presently claimed, it should be apparent to those of skill in the art that actuation means can be employed to force the structure to morph upon command or, with sensors, at a specified aerodynamic load.

In the one embodiment of the active adaptive approach, a single aluminum spar and with aluminum ribs will provide the primary structural support of the adaptive wing design. These are designed to support a three hundred pound (3001*b*) loading at six inches from the mounting point of the wing. The spar is precisely machined with guide hole inserts to allow structural ribs attached to leading and trailing edge structures to slide through. The mechanics of the sliding structure and several other factors come into play on the aeroelastic stability, therefore particular attention should be given to this during the design phase.

Figure 18:
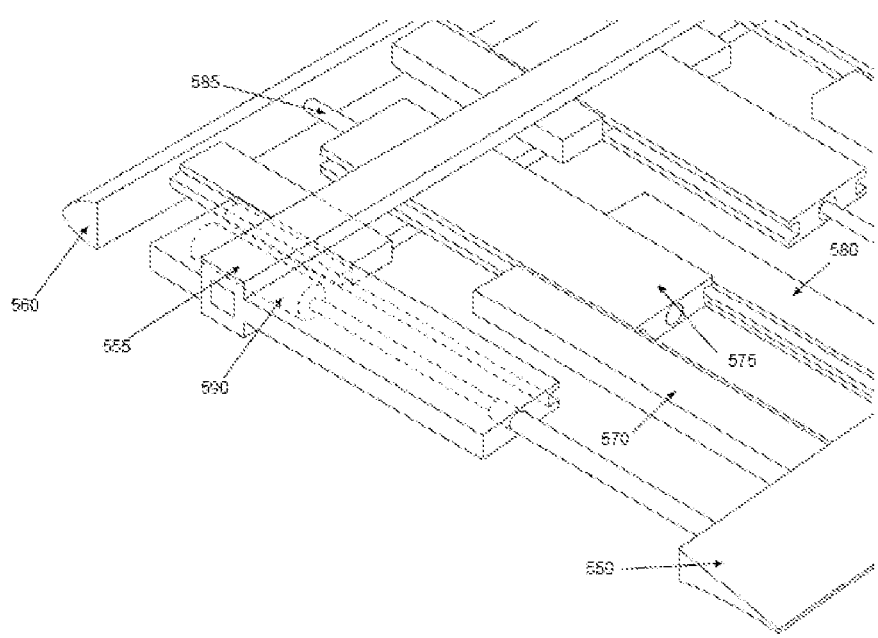
FIG. 18 is a perspective view of a second embodiment of a wing frame designed to move in order to change the chord length of the wing.

FIG. 18 shows one embodiment of the structure with a leading edge, 560, and trailing edge, 550. The structure consists of a sliding rib structure. The main spar at the quarter chord, 555, has ribs extending from it, 580, 570, 585, and 575, towards the leading, 560, and trailing edges, 550. Holes in the main spar allow these ribs to pass through the spar, which in turn gives the wing more expansion distance. Between the ribs extending from the spar are perpendicular bars. The leading and trailing edge ribs have grooves that correspond to these stoppers. This prevents the leading and trailing edges from expanding too far and transfers the load from the extended area of the wing to the main spar. The ribs from the leading and trailing edges are sized so that when the wing is expanded, the quarter chord remains at the same location to maintain airfoil balance. A rod, 565, is attached to a motor driven thread screw, 590, and the trailing edge, 550, to expand and contract the wing. Motors, synchronous pulleys, a synchronous belt, and lead screws/nuts can be used to actuate the wing structure.

The sliding rib substructure is one embodiment that is useful for the active morphing wing designed to prove the concept and feasibility due to its relative simplicity, its ability to handle the structural loads based on preliminary calculations, and the ability to actuate it linearly. However, as stated above each wing design must take into account the aerodynamic loads expected, and other features in order to design the optimal substructure for the wing.

Several concepts for actuating the expansion and contraction of the wing substructure were developed. These included: Power screws, Air pistons, Chemical reactions/charges, Hydraulics, Pyrotechnic actuators, Solenoids, and Fluidic muscles.

One embodiment consists of the concept of a rack and pinion driven by a stepper motor because the tongue and groove sliding rib structure already had some available structure required for the system. The system begins with miniature motors mounted parallel to the ribs in the main spar structure at various points for each edge. The motors are located at the thickest part of the airfoil so they can fit within the airfoil shape. The motors spin a shaft that runs through the ribs of the main spar. The shaft drives a gear or a series of gears. The gears rotate against teeth machined into the leading and trailing edge rails where the tongues are currently machined into the structures. The gears that are driven by the motors interface with the teeth of the edge rails inside of the grooves in the ribs of the main spar. The concept maintains the structural strength of the tongue and groove configuration because the ribs of the edge rails still slide into the grooves of the main spar, except the tongues have teeth cut into them and the grooves have gears resting inside them to propel the edge rails away from the spar. The pitch of the teeth and the gears can be set up to maintain the required 3:1 ratio of the expansion and position of the trailing edge to the leading edge.

The advantage of the rack and pinion design is that some components of the system can be machined into the structure. This reduces the number of parts in the system, which makes it less complex while retaining the overall structural strength. Also the required expansion ratio is easily achieved by the system. There are several advantages to the stepper motor and lead screw combination. Stepper motors travel a certain uniform radial distance per step. Therefore, the distance that the nuts must drive the structure in a linear direction can be converted to a rotary distance and then calculated into a number of steps that the motor must travel by dividing by the degrees traveled per step. This means that the system could be programmed to travel to a relatively precise distance without an encoder. Encoders, usually attached to a rear shaft on motors, are used in closed loop systems to provide feedback on the motor to its drive.

A second embodiment is a pneumatic concept for the sliding rib structure that could use the same types of parts, including $CO_2$ pressure, regulators and valves that are found in paintball markers. Calculations were performed based on Ø22" cylinders bored into each rib. The pressure equation to describe the system follows:

$$P = \frac{F}{A} = \frac{F}{\pi r^2 \times n}$$

Where P is pressure, F is the force required to stretch the skin, r is the radius of the cylinders, and n is the number of cylinders. Each edge has a piston in each cylinder for a total of seven cylinders per edge. The calculations, based on one hundred pounds (100 lbs.) of force required to stretch each edge, result in about 375 psi required for the system.

Several methods for providing air pressure to a pneumatic system are possible, including miniature air and vacuum pumps. Larger air pumps should not be used, because all of the mechanical parts of the actuation system must fit inside the wing. The maximum pressure that miniature pumps could provide, however, is not typically high enough for most applications. For a small high pressure source, 12 gram $CO_2$ cartridges could be used. At room temperature, the gas pressure of the cartridges is 850 psi. The pressure required to actuate the system is around 375 psi depending on the diameter of the pistons, which is within the capabilities of the cartridges.

The gas pressure varies depending on temperature, so at high altitudes the cartridges would provide less pressure. On the other hand, the shape memory polymer skin of the wing will need a heat source to activate before actuation begins, so this factor might also affect the temperature and pressure of the gas.

The cartridges contain $CO_2$ in both liquid and gas phases. As gas is released from the cartridge, liquid $CO_2$ in the cartridge vaporizes and the pressure remains constant (850 PSI at room temperature) until all the liquid vaporizes. Once all of the liquid is vaporized, the gas pressure in the cartridge begins to drop.

An expansion chamber and pressure regulator are required to ensure that just the right amount of gas is released to actuate the wing. The expansion chamber fills with the ideal volume of gas needed for all the cylinders in the wing root. The regulator keeps the gas in the chamber until the pressure is right, and then opens to release the pressurized gas into the wing cylinders. Regulators that are used to adjust the pressure of paintball markers operate from 200 to 1200 psi. They are inexpensive and small.

The edge rails are forced out by sealed pistons that are housed in the cylinders in the ribs. The gas pressure forces the pistons out and holds them in place until the skin becomes rigid again. When the wing is ready to morph back to its original configuration, a valve releases the pressurized gas, and the SMP skin contracts back to its original position, using its own restoring force to push the pistons back through the cylinders and slide the ribs to their starting points.

The main advantage of the system is that most of it fits inside the ribs of the wing. The $CO_2$ cartridges are the only parts that would have to be housed elsewhere, such as in the wing root, however, the wing will only be able to achieve a limited number of morphing iterations until the pressurized $CO_2$ runs out. In addition, the wing might not perform a full iteration at all if the restoring force in the skin is not strong enough to return the wing to its original position. Extensive analysis would have to be performed to determine the aerodynamic loads the wing will encounter during morphing and to figure out if the skin could overcome the forces and pull the substructure back into its un-morphed configuration.

Other embodiments included the use of magnets to propel the leading and trailing edge rails into their morphed configurations. A first magnet concept uses a linear induction system to actuate the wing. Electromagnetic coils are lined in the grooves of the ribs on the main spar substructure. The tongues on the ribs of the edge rails are permanent magnets. To propel the leading and trailing edges out into their extended positions, current would alternate through different coils to push and pull the rails into position. The process would act the same way to restore the leading and trailing edges to their original positions.

A second embodiment using magnets operates in the same way as the first concept, except the permanent magnets are pistons or rods that attach to either the leading or trailing edges at the position of the center of the ribs on the main spar substructure. The magnetic rods run through the center of the ribs in the main spar in a cylinder consisting of electromagnetic coils. Cylinders are bored out of the center of the ribs, the coils are inserted into the rib cylinders, and the rods are inserted into the cylinder created by the coils. The concept would be easier to fabricate than the concept that involves coils in the grooves and permanent magnets on the tongues. The tongue and grooves are also stronger since they are not modified at all and machined from solid aluminum.

The disadvantage of the concept is that it would take a great deal of time to design and fabricate the prototype components of the system. The system would involve many costly custom parts, complex electrical wiring, and control electronics to precisely control the coils and the position of the rails. Magnetic actuation will not be involved in the final design.

Figure 17:
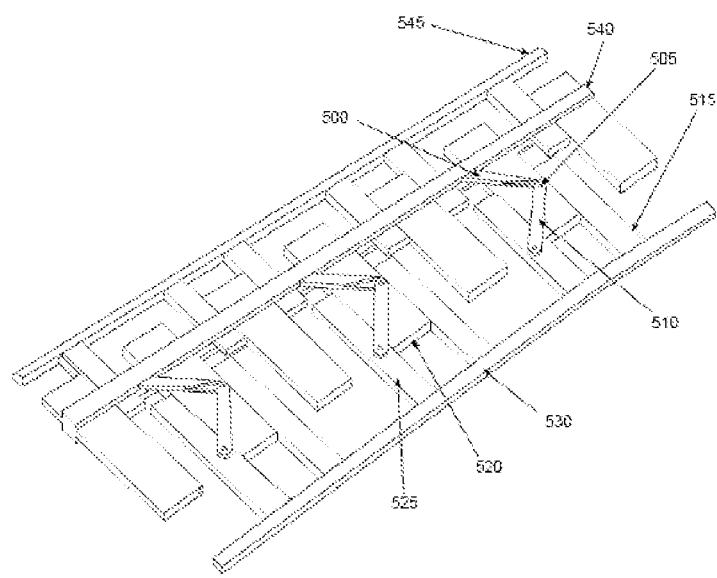
FIG. 17 is a perspective view of the structural design of a wing frame designed to move in order to change the chord length of the wing.

Another embodiment uses a system of linkages designed to multiply both the force and distance of actuators that would power the system. An example of the placement of the linkages can be seen in FIG. 17. Two links, 500 and 510, are pinned together, 505, and then one link, 510, is also pinned to the main spar, 530, while the other link, 500, is pinned to a point on a rib of one of the edge rails. Several of these linkages would be placed across the span of the spar. An important part of the concept is the ability for the linkages to be actuated by a single actuator at the root of the wing. Each linkage is connected to the linkages next to it by a wire or rod at the pinned center of the linkages. The actuator directly pulls on the pinned center of the first linkage, and since all of the linkages are connected, they all expand at the same time and rate.

The actuators needed to be capable of providing adequate force (~50 lbs) and expand and contract the required distances within one second. Conventional actuators will not work due to restrictions on the available volume. Several high force actuators were located; however, they were fairly small and did not provide the actuation distance needed. A system of linkages was developed to allow these small, high force actuators to be added to the selected design concepts.

Fluid actuators such as air pistons and hydraulic systems provide high forces and can actuate quickly, but require a stored reservoir of fluid that is difficult to fit inside the wing. The single charge actuators, such as pyrotechnic actuators and airbag charges, can output a high force quickly, but again, require space to store several charges if more than one morphing cycle is required. Linear actuators, such as ball screws, can output a high force, but are typically slower and require access to the aircraft's power supply. All of these advantages and disadvantages need to be weighed in order to fit the optimal actuator to the system.

The development of the actuation system for integration into the expandable morphing wing substructure was an important component for the demonstration of a complete morphing system. The following list outlines the parameters targeted for the actuation system design: Compact Size: fit within 15 in.×4.5 in.×0.6 in., wing profile: 3:1 trailing edge to leading edge expansion ratio; Total edge displacements: 2.7 and 0.8 inches for the trailing and leading edges respectively; and one hundred pounds (100 lbs.) of force required to actuate each edge.

The preferred embodiment for the sliding rib substructure, is an actuation system concept that includes DC motors, timing belts, timing pulleys, and lead screws. Ball screw and lead screw linear actuation systems are commonly produced in commercial off-the-shelf (COTS) packages. The motors and gearboxes in these systems are usually in line with the lead screws however, which adds either extra length or width to the total package, and linear travel of the actuators are therefore much less than their total length. Also, no COTS solution could be found that fit within the 0.6 inch wing thickness. To compensate for the size constraints, the actuation concept allows a DC motor or motors to be housed in the root of the wing, which operates a timing belt that runs along the span of the wing and spin timing pulleys that in turn rotate lead screws nuts that house lead screws which translate linearly to push the leading and trailing edges into position.

One lead screw nut is housed in each rib of the main spar substructure. A lead screw is housed in each nut. The lead screws have machined, standard 2-56 threads on one end that screw into either the leading or trailing edge rail. Near the main spar, timing pulleys connect to each nut. The timing pulleys are all in line with each other so a single belt can span all pulleys. A pulley is also shown mounted at the tip for the original configuration. The belt shields cover the timing belt that runs across the timing pulleys, protecting it from other moving structural components and ensuring that the teeth of the belt stay in mesh with the teeth of the pulleys.

The thread of the lead screws is described as the "lead." The lead is the distance a lead screw will translate per revolution of the nut, or vice versa. In order to achieve the 3:1 expansion ratio of the trailing to leading edges of the wing, the lead picked for the screws that actuate the trailing edge was three times greater than the lead picked for the screws that actuate the leading edge. In addition, to allow the lead screws to translate in opposite directions while all lead screw nuts spin in the same direction, the leading edge screws were chosen to be left hand threaded, while the trailing edge screws are right hand threaded. The three lead screws that attach to the leading edge have a 0.125 inch lead. The four lead screws that attach to the trailing edge have a 0.375 inch lead. All lead screws were purchased from Kirk Motion Products, Inc.

The first iteration of design also included the selection of DC motors for system actuation. Faulhaber 1224 Coreless DC motors with Series 12/4 256:1 reduction ratio planetary gearheads and series HE magnetic encoders were chosen for the actuators. The motors were selected for two main reasons. First, they have a small, 0.47 inch diameter. It was found that the motors could be integrated into the root structure of the wing with modifications to the root airfoil. Second, calculations performed by engineers showed that four 1224 motors working together could provide enough torque for the one hundred pounds (100 lbs.) of force required to actuate each edge of the wing.

A Faulhaber motion control system was chosen to control the motors. The system consists of four MCDC 2805 microcontrollers and three multiplexer boards. The multiplexer boards allow all of the controllers to receive the same source signal so the motors operate in synchronization. The wing is mounted on a box that contains the control electronics for the motors. The motors are daisy-chained to each other with small timing belts, while a longer timing belt runs from the motor closest to the morphing wing section to the wing tip.

In addition to changing the size of the wing's structural elements, the wing skin must also change shape or else it will break. The best material for creating a structurally strong skin that can also stretch upon command is shape memory polymer (SMP) and SMP composites. The best method for activating the SMP is to use metal coated fabric in the manufacture of the SMP composites with embedded elastic Wires. The heat distribution in the wing from this skin type was very even when the SMP sheet was stretched and the power requirements remain relatively constant while the skin experienced high strain deformations.

As disclosed in U.S. patent application Ser. No. 11/496,352, filed by Hemmelgarn, et al., on Jul. 31, 2006, which is herein incorporated by reference, metal coated fabric can be used and imprinted with any design required. To create a piece of the conductive composite material, a piece of metal coated fabric is placed on a flat glass surface ensuring that there are no stray fibers and the fabric piece is smooth. Bleeder and breather fabric are placed on top of the fabric. Then the entire system is placed in a high temperature vacuum bag with a vacuum valve stem on one end and a second valve on the other. One end of a tube is connected to the second valve and the other end is placed into a vat of resin. A vacuum is thoroughly applied, ensuring that there are no leaks, such that resin in drawn from the vat through the fabric. Care is taken to ensure the entire fabric is soaked with resin, the fabric remains flat, and that no air bubbles form. Once the part is soaked with resin, the composite part is cured with the following cycle: 1) A one-hour linear ramp to 75° C. in an oven, autoclave, or other form of controlled heating device; 2) A three-hour hold at 75° C.; 3) A three-hour linear ramp to 90° C.; 4) A two-hour linear ramp to 110° C.; 5) A one hour linear ramp to 20° C. After curing, the composite is removed from the oven and allowed to cool to room temperature. The vacuum bag, bleeder fabric, breather fabric, and glass plates are removed from the composite. Alternatively the part may be cured at room temperature for approximately 24 hours to ensure a full cure of the resin with a glass plate on top to ensure the part remains flat. Once the conductive composite part is cured, it is removed from the bag for use. The present embodiment uses one layer of metal coated fabric. It will be appreciated that more than one layer of fabric reinforcement can be used and will affect the final conductivity of the material.

In addition to the wing substructure, the aerodynamic shape of the wing must be maintained during a morphing event. In order to accomplish this with the SMP skin activated, a structure capable of supporting the SMP skin in flight is needed.

One embodiment of this in the active morphing wing is an unexpanded aluminum honeycomb integrated into the morphing wing system for maintaining the wing skin profile during a morphing operation. When aluminum honeycomb is manufactured, thin sheets are cut from a block and then welded together. These welded sheets form a block that looks solid, but is formed from these thin sheets. The honeycomb is then pulled into the expanded form, creating the cell holes.

Figure 19:
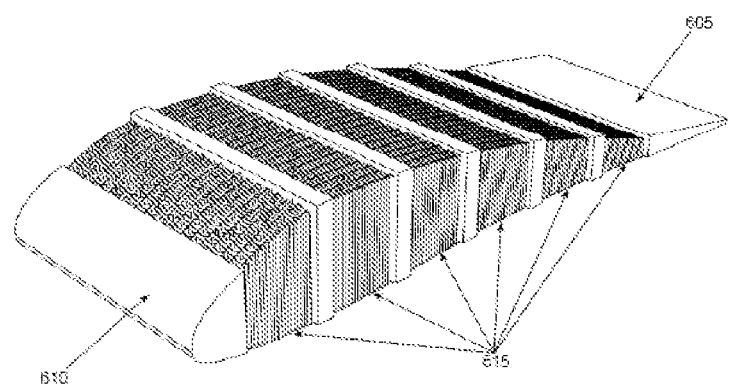
FIG. 19 is a perspective view a third embodiment of a wing frame designed to move in order to change the chord length of the wing.
Figure 20:
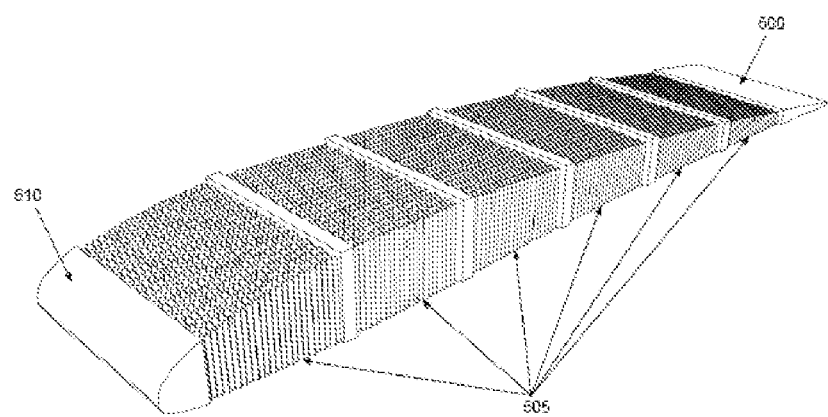
FIG. 20 is a perspective view of the third embodiment of the wing frame with a longer chord length.

Once the aluminum honeycomb is fully expanded, it goes beyond the point of plastic deformation and therefore cannot return to its original state. The unexpanded block of honeycomb is used as the substructure airfoil contour control while the wing morphs. When the wing is in its unexpanded state, the honeycomb is fully contracted. When morphed, the honeycomb is able to stretch with the skin. Because the honeycomb is not expanded beyond its plastic deformation limit, it returns to the unexpanded shape when the wing returns to its unexpanded shape. This also allows for the unexpanded block to be easily machined to the airfoil contour shape. FIG. 19 shows the honeycomb aluminum wing design with the leading edge, 610, and trailing edge, 605, connected by the unexpanded honeycomb aluminum, 615. FIG. 20 shows the fully expanded honeycomb aluminum wing design with the honeycomb aluminum, 605, connecting the leading, 610, and trailing edges, 600. Motors in the root, lead screws in the ribs, and rods interspaced in the honeycomb structure can provide the driving force to expand and contract the wing as needed.

Activation of Wing Skin in Active Morphing System

In order for the SMP skin to stretch or contract during a morphing event the SMP must be activated. There are numerous ways to activate SMP, including heat or thermal energy provided by resistive heating, electromagnetic radiation, including light and UV light waves, magnets, water, electricity, and other means known to activate SMP.

Carbon nanofiber loaded SMP shows some desirable characteristics, such as conductivity in the range necessary for resistive heating. However, further research with the material showed a logarithmic increase in resistivity as a function of elongation. These results showed a complete loss of conductivity much earlier than the necessary minimum elongation of 100%. The loaded SMP also demonstrated a significant reduction in maximum elongation, prohibiting use of this approach for the morphing application.

Another material with proven results is SMP loaded with nickel nanostrands. This additive has demonstrated resistive heating using a DC power source. Samples incorporating the nickel nanostrands into the toughened SMP system have shown the necessary conductivity for resistive heating. However, these samples also increased resistivity as elongation lengthened and greatly decreased the maximum elongation of the material system.

Another difficulty with the previously mentioned additives is the sharp increase in resistance as a function of elongation. This problem may be avoided by the introduction of a highly conductive macroscopic fiber, such as nickel coated, chopped carbon fiber. The fibers interfere with the elongation, although at low loadings the desired elongation may still be attainable. The combination of low loadings of the nickel coated, chopped fibers with any of the previous additives may produce the desired balance of conductivity and elongation. A tube made with two layers of neat SMP sandwiching a nickel coated and graphite-loaded SMP was made, and showed conductivity well beyond what is necessary for resistive heating. This demonstrated the feasibility of using a conductive filler in a thin layer to obtain conductivity. Combining this procedure with a tailored filler loading, it was thought to be possible to make a material with a very thin layer that can act as a resistive heater. This could allow low loadings of a conductive filler to provide a resistive heating layer for the entire material system.

Several different embodiments incorporate heating pads as the activation source. One method uses layers of thin heating pads similar to scales. This may allow the heating pads to uniformly distribute the heat even after elongation. Another method attempts to create an elastic heating pad that can elongate along with the SMP skin. This would involve the use of an elastic matrix with nickel-coated, chopped carbon fibers as the heating element.

It may also be possible to utilize the honeycomb structure as a distribution mechanism for hot air as an activation power source. Equipping individual cells in the honeycomb with a heating element could allow uniform heating. This method relies on the honeycomb either stretching or morphing with the skin. The other idea involves strategically using the honeycomb network as a duct system to distribute heated air. If hot air can be distributed strategically using the honeycomb network, it may be possible to successfully distribute heated air.

A breakthrough in activation arrived with the introduction of high-strain, fabric-reinforced (HSFR) composites using the SMP resin as the polymer matrix. Introduction of the HSFR into the SMP significantly improved the tear resistance of the material system, allowing previous activation methods with material failure drawbacks, such as embedded nichrome wires, to be revisited. By sewing the nichrome wires into an HSFR material perpendicular to the axis of elongation, it is possible to activate the material and still obtain a high elongation in one direction. Investigations showed activation in less than twenty seconds with at least 100% elongation.

The HSFR composite technology does help with many aspects of activation, but early efforts encountered several problems that had to be overcome. The sewing method in which the nichrome is added to the HSFR material is an inefficient and imprecise method of obtaining the correct wire spacing. A conventional sewing machine is used in order to evenly secure the wire to the material. The nichrome wires in these samples are all spaced at 1/16 inch intervals. This spacing was determined by fabricating samples similar to these with slightly different wire spacing in order to determine the maximum spacing that will achieve even activation when the material is stretched 100%. Spacing the wires 1/16 inch at the root of the morphing section and 1/16 inch at the tip allows for heat to be distributed across the entire surface of the morphing sections of the wing. One possible issue also noted during this analysis was that after stretching the sample, the surface becomes rougher than the original sample.

To avoid the need to sew nichrome heating elements into the HSFR pre-forms, the stand-alone nichrome wire patterns were chemically etched for integration into the composite lay-up process. This approach helped reduce the steps and time required to fabricate the wing skin with embedded heating elements.

The concepts mentioned above that include the integration of nichrome heating wire or a chemically etched metal heating grid have been determined infeasible due to the geometry of the skin and the space available for wires to supply all elements with power.

Another breakthrough in the wing skin fabrication process has led to the development of heating fabric by using conductive HSFR mapped out into a heating grid. An electrically conductive HSFR provides enough resistance to act as a heater. However, when stretched, the resistance of the material increases only slightly, allowing very large percent strains without a large variation in electrical resistance. This conductive HSFR will be integrated into the wing skin for heating. The base layer is a non-conductive HSFR sample. The pattern on top of the base layer is a sample of conductive HSFR, with the heating design chemically etched out, to act as a heating grid. The heating pattern is connected to a power source via conductive epoxy that is attached to the sample.

The conductive HSFR heater offers a significant advantage over other heating methods because it can stretch with the skin while maintaining an almost constant resistance and heat distribution. The spacing between heating lines on the skin is constant in all configurations, which eliminates the possibility of inadequately heated portions of the skin.

This concept has extended to the ability to mask off an area on the conductive HSFR and chemically etch the conductive material similarly to methods of circuit board etching. This makes it possible to integrate a single layer of HSFR into the wing skin and will result in uniform heating through the entire thickness of the composite. The nickel foil used early in the development phase was later replaced with wires connected with an electrically conductive epoxy. Standard soldering processes are not acceptable because the temperature required can melt the HSFR. These two wires will run out of the wing skin, through the root structure of the wing, and then out of the root structure to the power supply.

A heating grid was designed to be chemically etched onto conductive HSFR by the supplier. These grids have demonstrated the circuit's ability to stretch up to 100% with very little change in surface resistance, making it an effective solution for the morphing, thermally activated wing skins.

A heating grid should be designed for the morphing wing skin, to be chemically etched onto conductive HSFR. The pattern will be cut so that this section fits neatly around the tip of the wing. Various patterns can be used and should be obvious to those of skill in the art.

A junction can be created where the root meets the skin to connect a wire on each side of the wing. The connection will preferably be made with Circuit Works Electrically Conductive Epoxy. Both the top and the bottom of the skin will have a wire that will run out of the wing skin, through the root structure of the wing, and then out of the root structure to the power supply. The position for the wires leaving the skin was chosen based on where the HSFR has minimal shift during a morphing action.

Passive Morphing Wing Structures

Passive morphing wing structures will rely on the loads exerted on the wing by moving through a fluid to morph the wing into the optimal shape. As the load on the wing increases, the wing can either move linearly or non-linearly, depending on the desired movement. Non-linearity is preferred for HALE systems because the wing is able to respond more quickly and is used to control the aircraft's dynamic response to gust and maintain aeroelastic stability.

The step wise changes can assist the aircraft in responding to gusts and turbulence more quickly than active morphing systems; however, linear responses can be designed if needed.

Figure 1B:
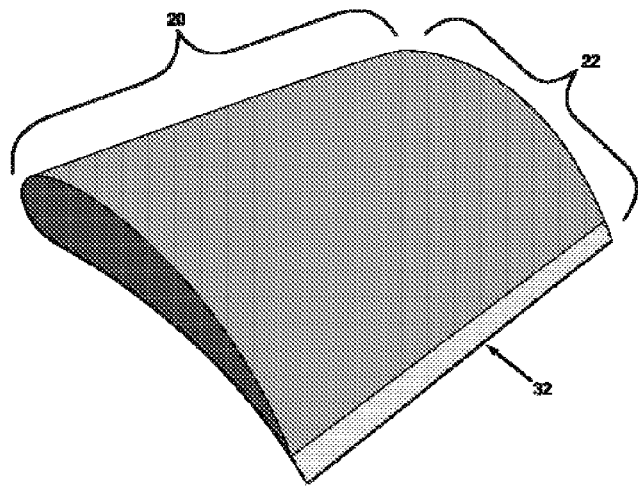
FIG. 1b is a perspective drawing showing the wing as a single piece.

FIG. 1a shows the entire wing, 20. The leading edge, 45, and trailing edge 25, are shown. The structural element, 40, is one design of a structural element that can be used for this embodiment of passive morphing wings. The structural element, 40, can have one or multiple buckling members, 35, which can each buckle at the same or different loads. Additionally, the wing skin can have one or more areas associated with the buckling members, 35, that will stretch and relax based on the movement of the buckling members, 35. If the wing skin is pre-strained, these wing skin areas, 5, 10, and 15, will not lose their aerodynamic shape upon buckling because of the inherent properties of the preferred elastomeric composite used to make the skin. Dynamic modulus resins and composites can also be used to make the skin. As with any wing, multiple structural elements are used to support the entire wing skin with the distances between the multiple structural elements dependent on the wing's desired properties and on the support system needed. FIG. 1b represents the seamless nature of the wing in its final form. Such elastomeric resins and dynamic modulus resins are described in U.S. Pat. No. 6,759,481 issued to Tong on Jul. 6, 2004, with other thermoset resins seen in PCT Application No. PCT/US2005/015685 filed by Tong et al on May 5, 2005, and PCT Application No. PCT/US2006/062179, filed by Tong, et al on Dec. 15, 2006, all of which are herein incorporated by reference.

Figure 2:
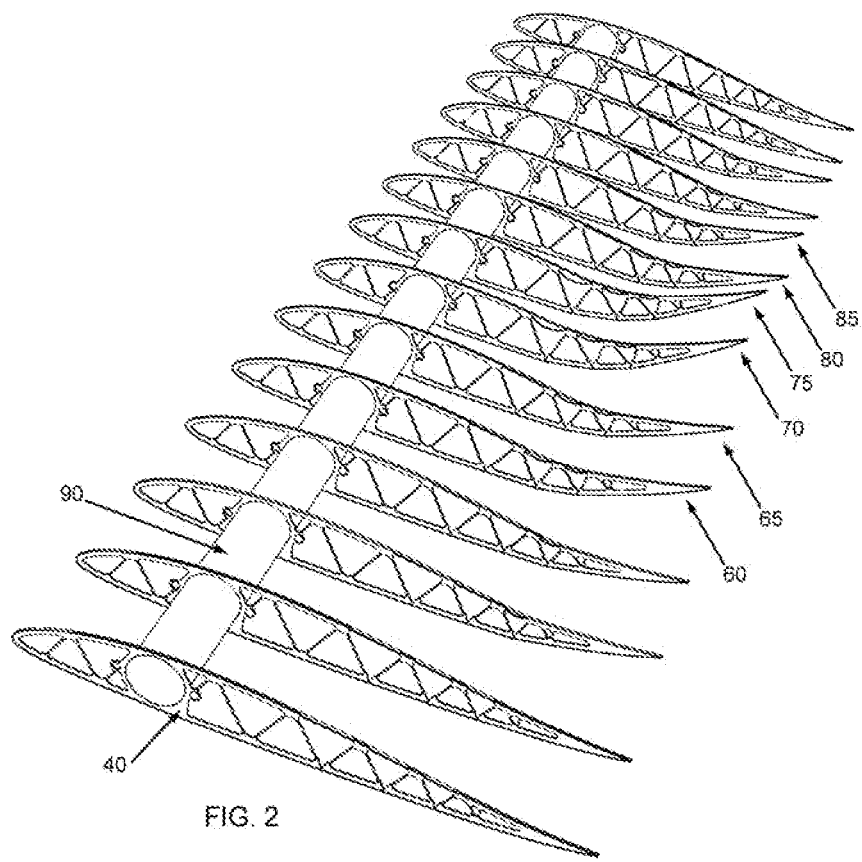
FIG. 2 is a perspective drawing showing the various structural elements (60, 65, 70, 75, 80, and 85) in different positions of deformation.
Figure 3A:
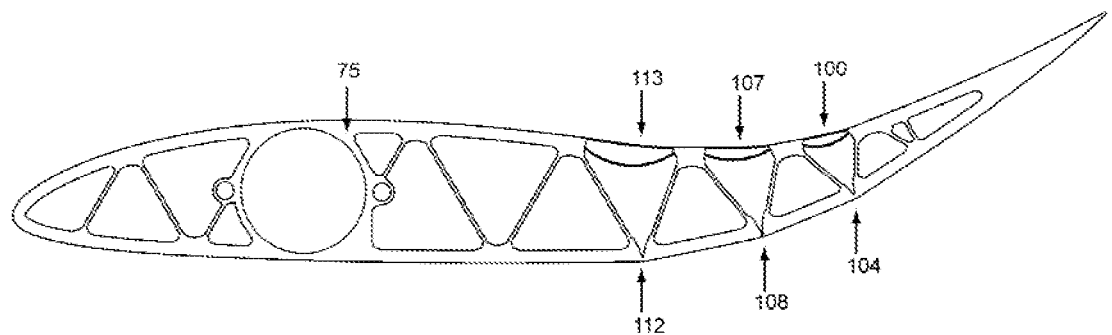
FIG. 3a is a side view of one of the structural parts (75), with various sections (100, 107, 113) in a deformed state.
Figure 3B:
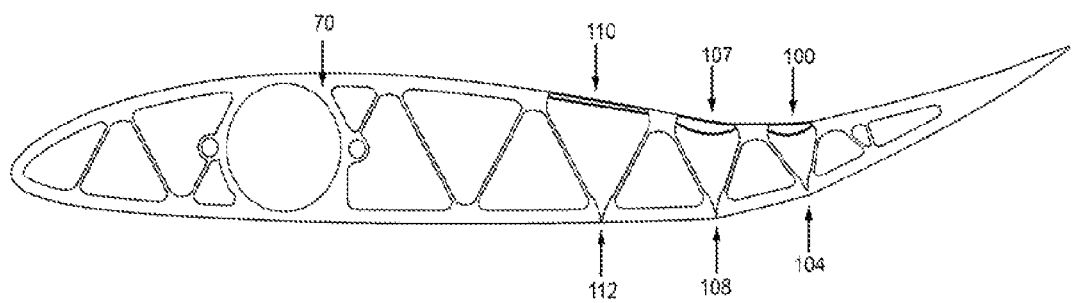
FIG. 3b is a side view of a second structural part (70) with various sections deforming (100, 107) or remaining in their original shape (110) in order to create a second deformed state.
Figure 3C:
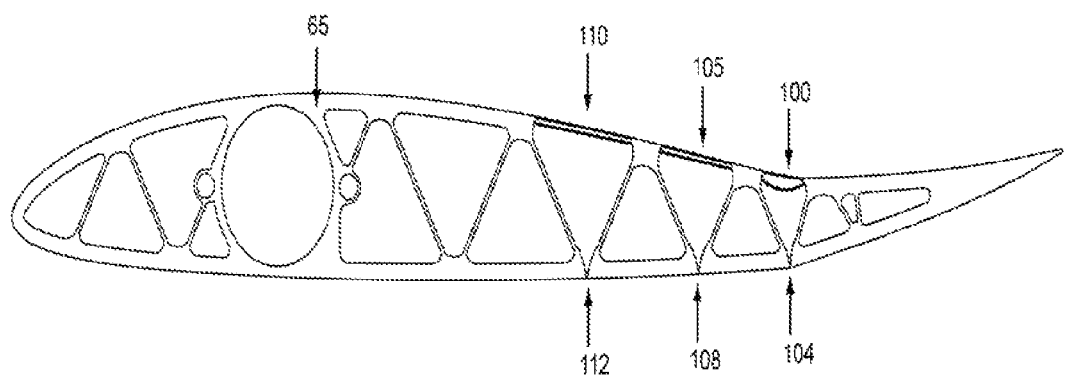
FIG. 3c is a side view of a third structural part (65) with one section (100) in a deformed state and the remaining sections (105 and 110) remaining their original shape in order to create a third deformed state.
Figure 3D:
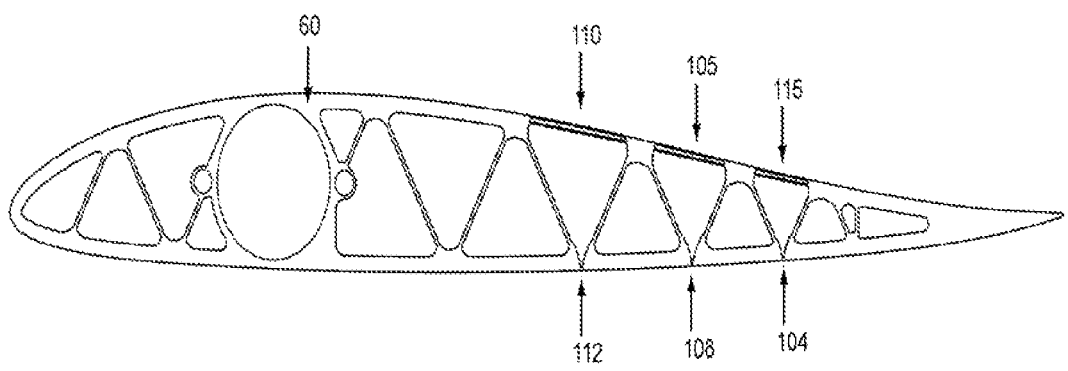
FIG. 3d is a side view of a fourth structural part (60) with all sections (105, 110, and 115) remaining in their original shape.

FIG. 2 shows the interior of the wing with multiple structural elements, 40, 60, 65, 70, 75, 80, and 85, supported and attached to a wing spar, 90. The structural elements each have buckling regions that allow each structural element to move independently of the other. This can be seen as element, 75, is deflected the most, with elements 60, 65, 70, 80, and 85, each deflected different amounts. FIG. 3a shows that structural element, 75, has three different buckling regions, 113, 107, 100, each of which has buckled. The design also includes a pivot region, 112, 108, 104, for each buckling region to reduce the stresses on the structural element and allow the wing to buckle and move as designed. Similarly for FIG. 3b, the structural element, 70, has three buckling members, 110, 107, 100; however, only the buckling members, 107 and 100, have buckled, providing for less movement of the trailing edge of the wing. The same is true for FIG. 3c where the buckling elements, 105 and 110, have not buckled, and with only buckling element, 100, buckling, this allows for even less movement. Finally, as seen in FIG. 3d, none of the buckling elements, 105, 110, or 115, have buckled, and the wing is in its normal configuration.

Figure 4A:
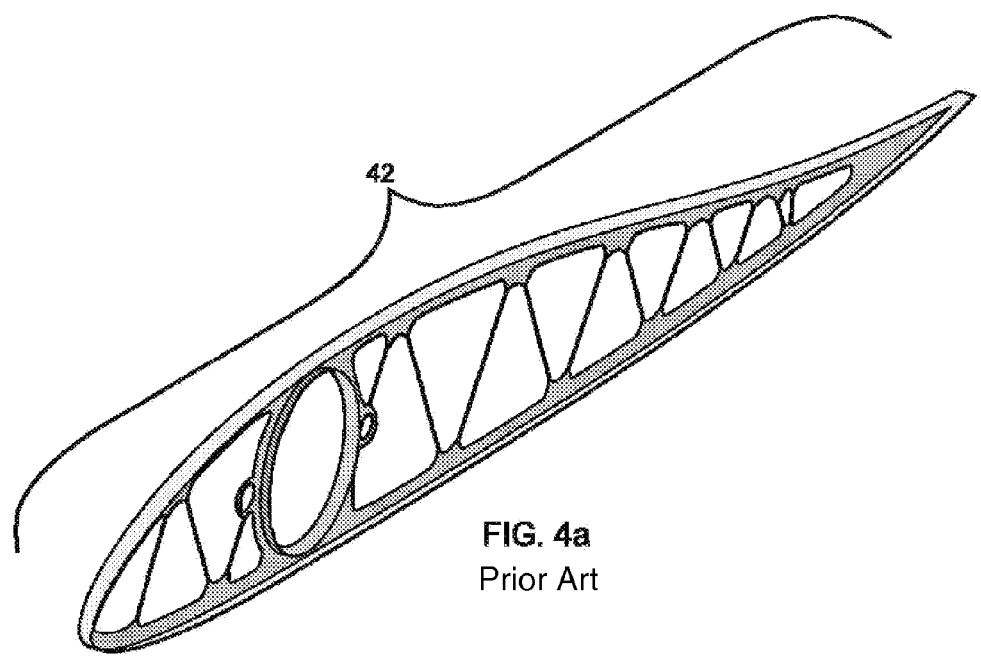
FIG. 4a is a perspective view of a structural element without a morphing section.

FIG. 4a is the preferred wing structural element for the preferred embodiment for HALE wings; however, those of skill in the art will realize that each wing and structural element must be designed for the expected operating conditions of the wing.

Figure 4B:
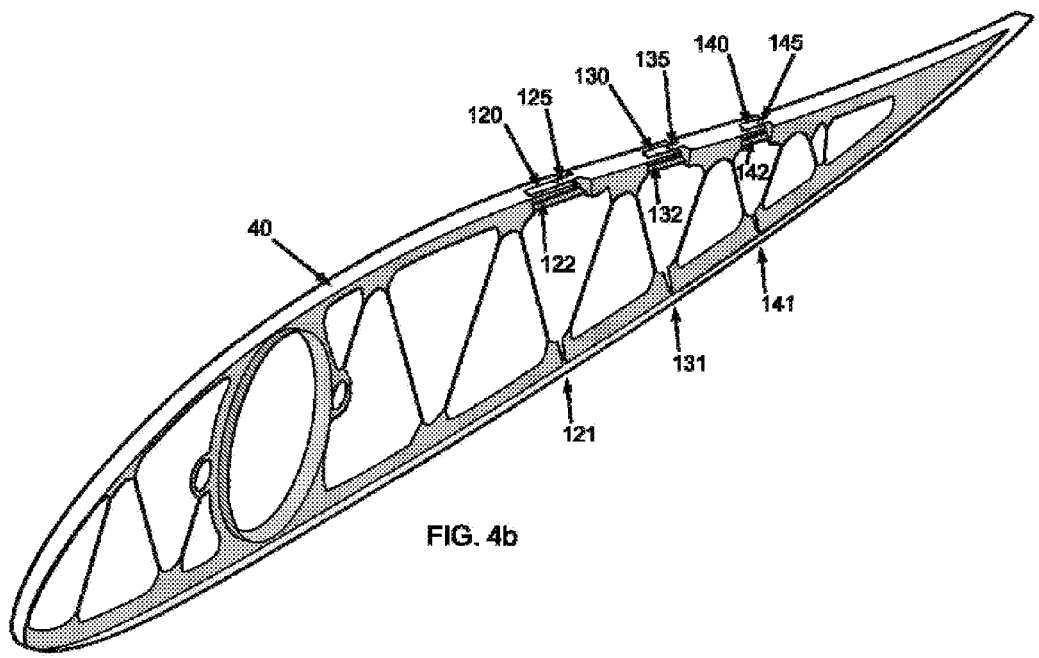
FIG. 4b is a perspective view of a structural element with the buckling sections.

FIG. 4b shows the structural element, 40, with the preferred design of buckling elements. The buckling region includes a buckling member, 122, 132, and 142, a stopper bar, a pivot region, 121, 131, and 141, and a sliding flange interface, 120, 125, 130, 135, 140, and 145. The buckling member was placed within the web of the rib near the upper surface in order to transfer normal operating loads effectively through the region by maintaining a high cross-sectional moment of inertia. When a critical load is reached causing a buckling member to buckle, the portion of the airfoil behind that buckling region pivots upwards. The axis of rotation for the pivot is forced to fall in the pivot region below the buckling member due to the removal of the web material in that area. When the deflection reaches its limit determined by the engineered response, it is halted by coming into contact with the stopper bar. The stopper bar is a tubular structure placed above a buckling member. It is more robust than the buckling member, so it will withstand and transfer higher loads through the structure after the structure buckles. Finally, the sliding flange interface represents a mechanism that allows the upper surface of the rib on each side of a buckling member to flex uniformly across the gap created by the buckling region.

Figure 5:
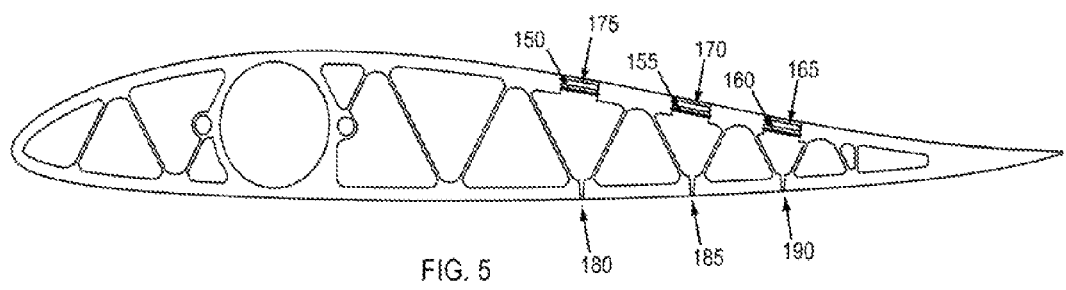
FIG. 5 is a side view of the structural part with the buckling sections.

Features for mounting the buckling members are shown in FIG. 5. The V-shape of the groove, 180, 185, and 190, allows the buckling members, 150, 155, and 160, to pivot as if they were in a pin-pinned configuration. An additional flange extends from the end of the V-shaped flange and into the web to help distribute loads across the full width of the buckling member rather than concentrating the load where the web intersects with the buckling member.

Figure 6:
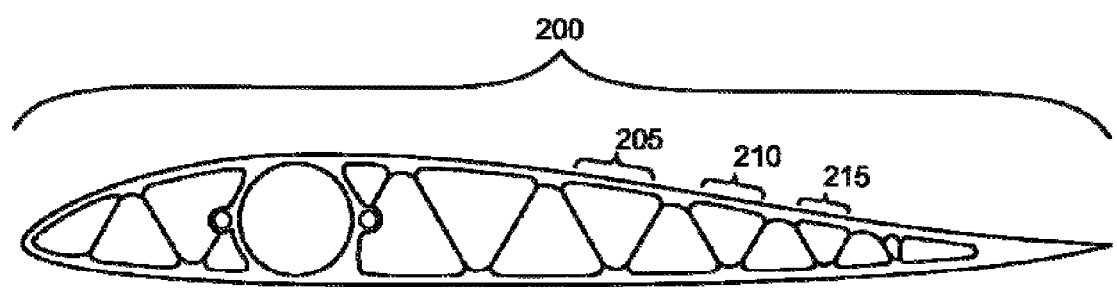
FIG. 6 is a side view of the structural part showing the ideal locations for the buckling sections.
Figure 7:
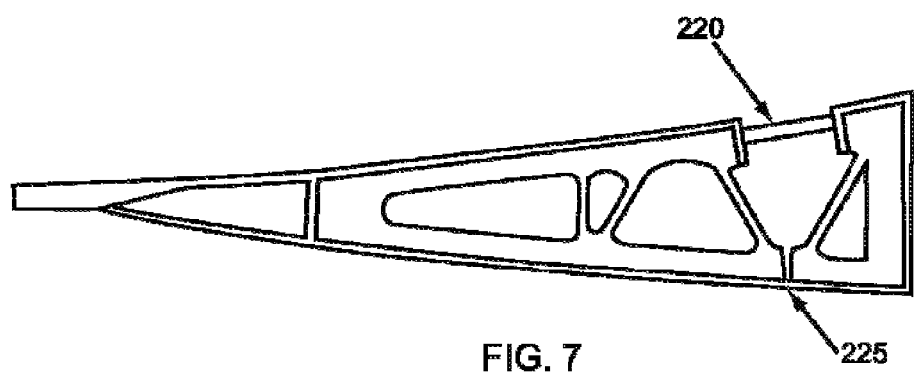
FIG. 7 is a side view of the end of one of the structural parts showing the buckling section (220) and a pivot region (225).

FIG. 6 shows a side view of the structure, 200, with section, 205, 210, and 215, representing where the buckling feature should be placed. FIG. 7 is a close up of one buckling section, 220, with a pivot section 225.

Figure 8A:
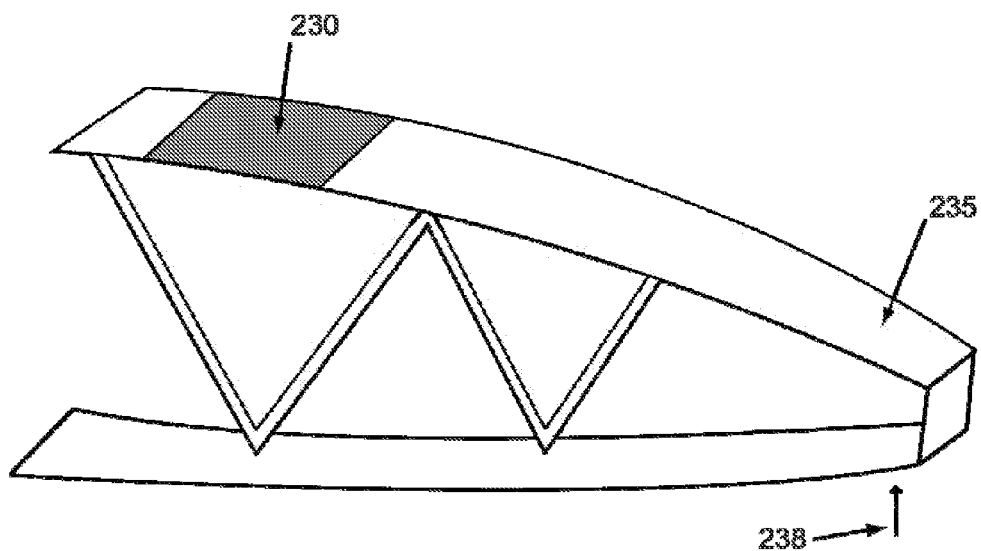
FIG. 8a is a perspective view of a second embodiment of the buckling member where the buckling section (230) allows the end of the structural part (235) to move.
Figure 8B:
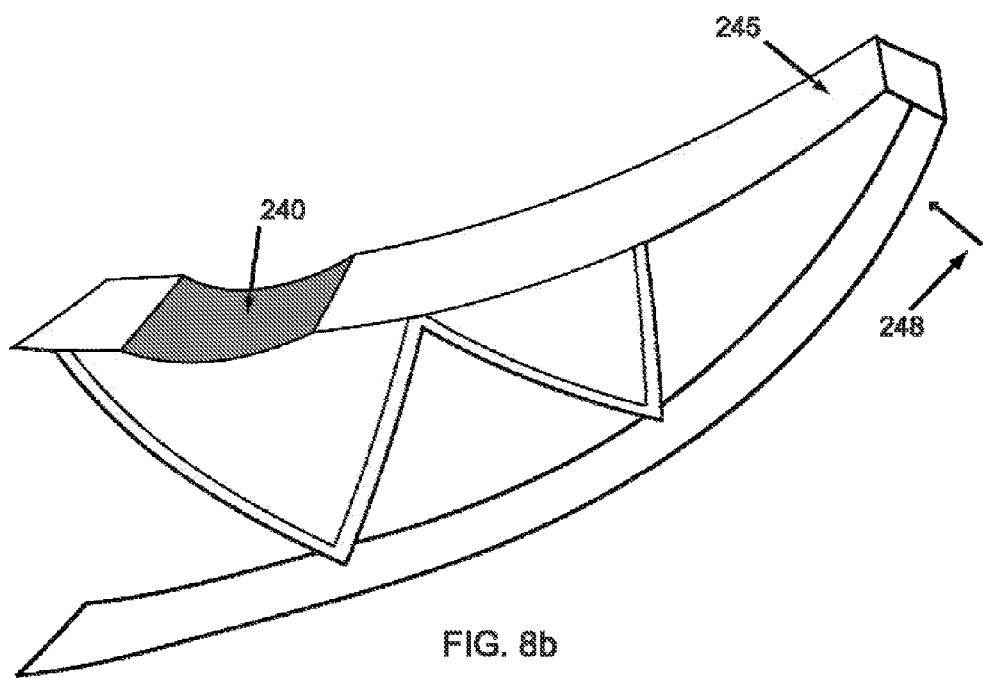
FIG. 8b is a perspective view of the second embodiment of the buckling member where the buckling section (240) has buckled allowing the end of the structural part (245) to move.
Figure 9A:
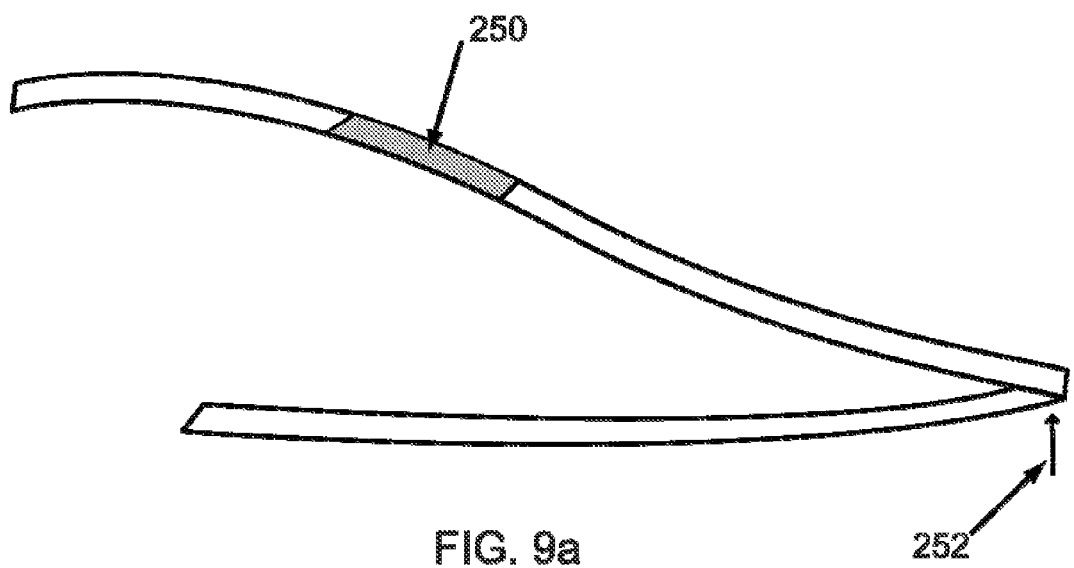
FIG. 9a is a side view of a third embodiment of the buckling wing wherein the structural part is allowed to move if the buckling section (250) buckles.
Figure 9B:
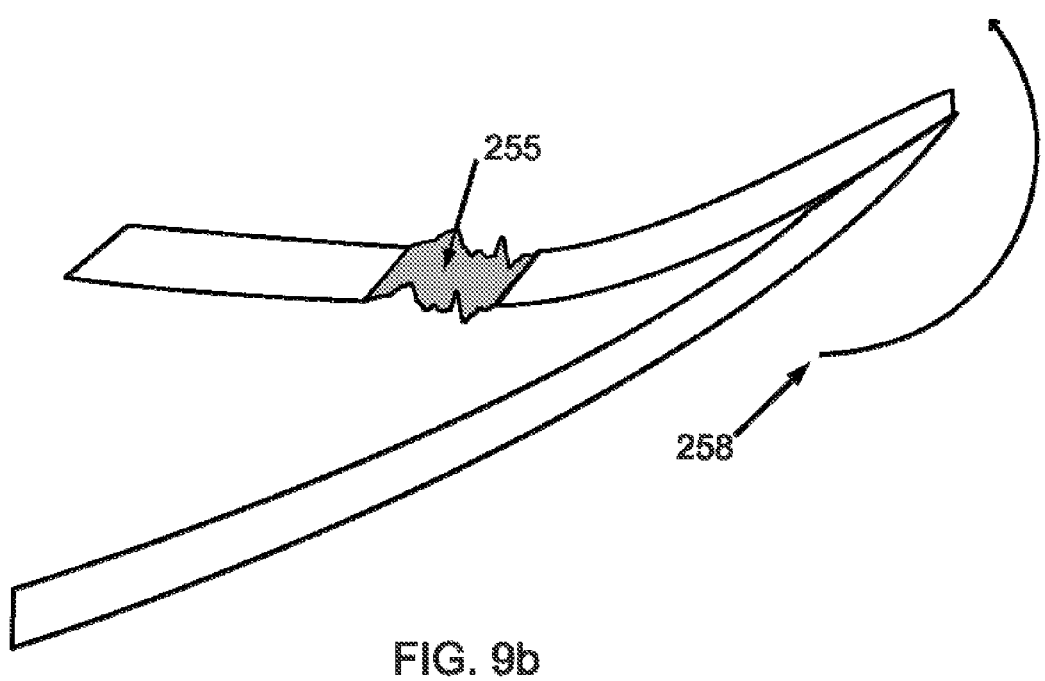
FIG. 9b is a side view of the third embodiment of the buckling wing wherein the structural part has moved after the buckling section (255) has buckled.
Figure 10:
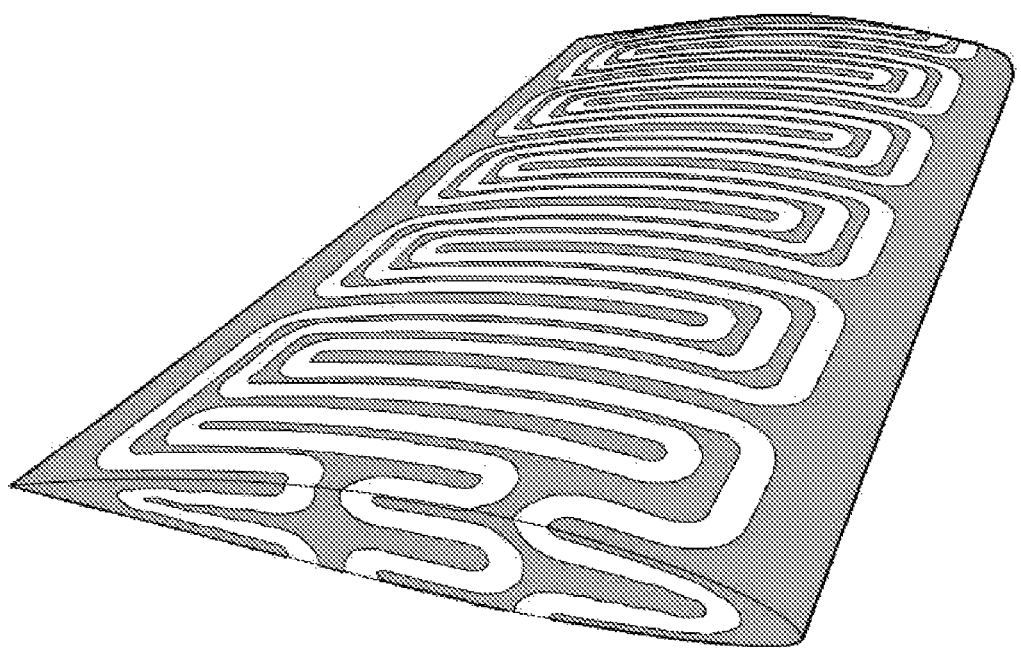
FIG. 10 is a perspective view of a morphing wing skin with heating elements embedded in it.

FIG. 8a shows a second potential structure with a buckling region, 230, buckles the wing tip, 235, when a force, 238, is applied. FIG. 8b shows the second potential structure in the buckled stated with the buckled regions, 240, forcing the wing tip, 245, up after the application of a force, 248. Likewise, FIGS. 9a and 9b show a third potential structure with a buckling region, 250, that buckles, 255, upon application of a force, 258.

Figure 11A:
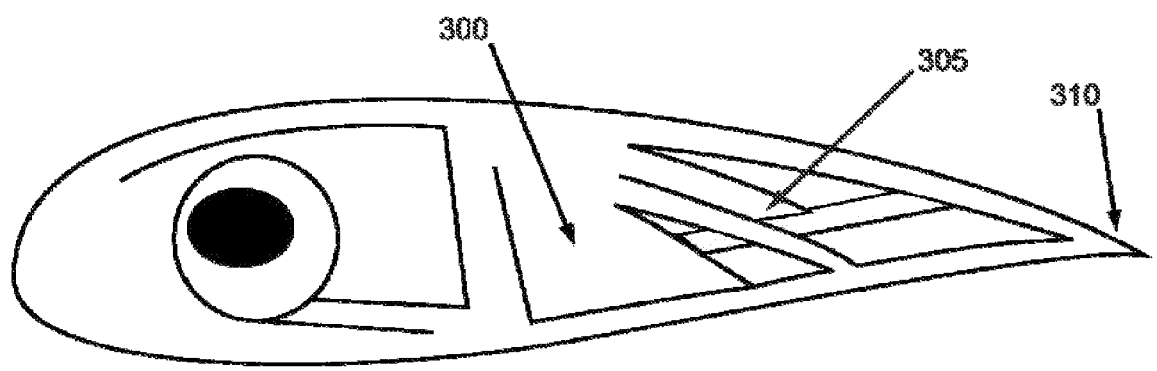
FIG. 11a is a side view of a fifth embodiment of the buckling wing structural member.
Figure 11B:
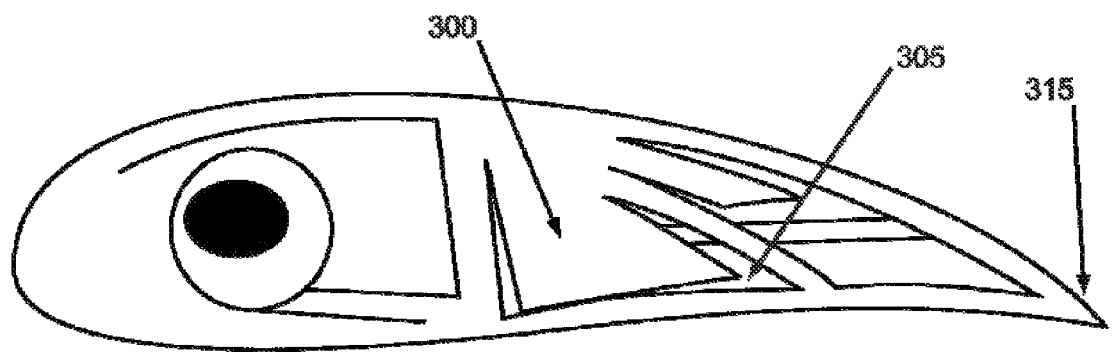
FIG. 11b is a side view of the fifth embodiment wherein the buckling members have moved slightly in response to the forces on the wing.
Figure 11C:
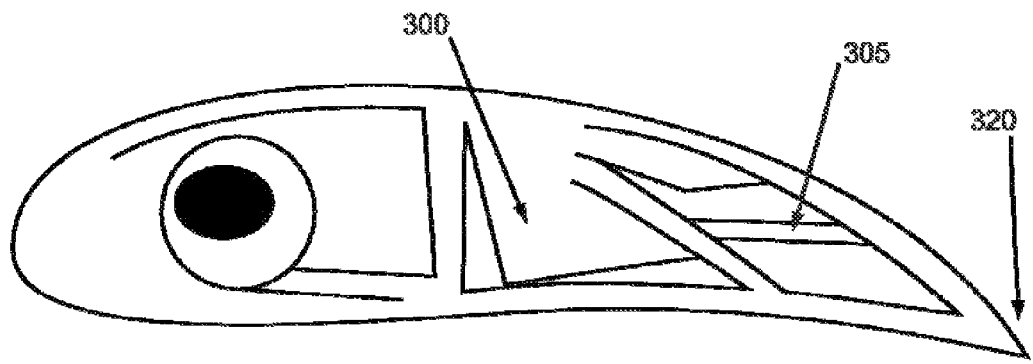
FIG. 11c is a side view of the fifth embodiment wherein the buckling members have moved significantly in response to the forces on the wing.

FIGS. 11a, 11b, and 11c show another design where a piece, 300, buckles and moves the wing tip, 310, from its normal state to a middle state, 315, and a final state, 320, depending on how much force is applied.

Figure 12A:
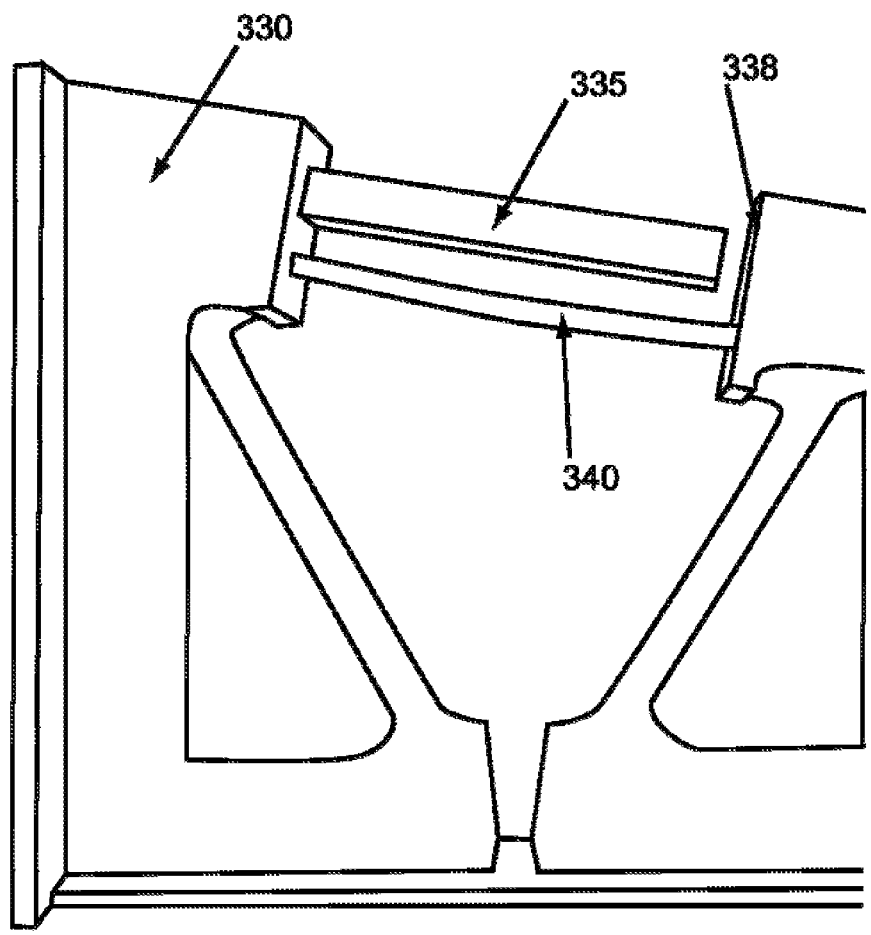
FIG. 12a is a close up of the first embodiment of the buckling member section with a buckling member (340).
Figure 12B:
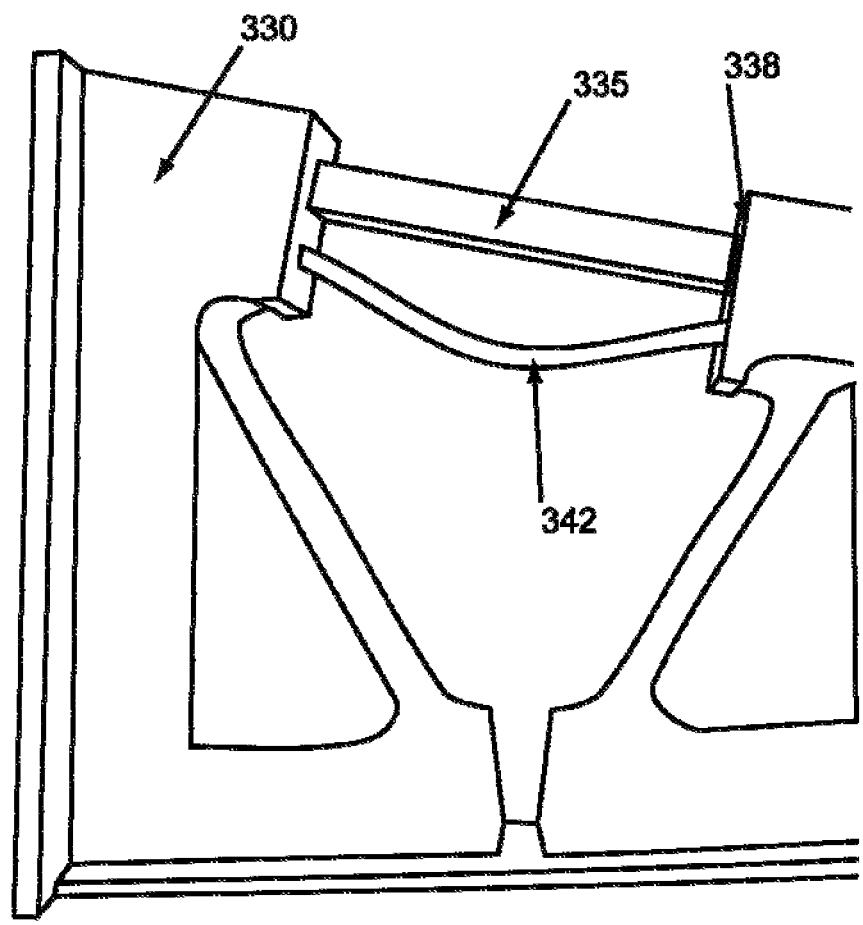
FIG. 12b is a close up of the first embodiment of the buckling member (340) in a buckled state.

FIG. 12a is a close up of a buckling member preferred design with a structure, 330, having a buckling member, 340, and a stopper bar, 335, which acts to prevent movement of the structure past a certain point and in which the stopper bar, 335, prevents movement upon striking the far side of the structure, 338. FIG. 12b shows the structure, 330, with a buckled member, 342, and the stopper bar, 335, touching the far side, 338, to prevent unwanted movement of the structure 330.

Figure 13:
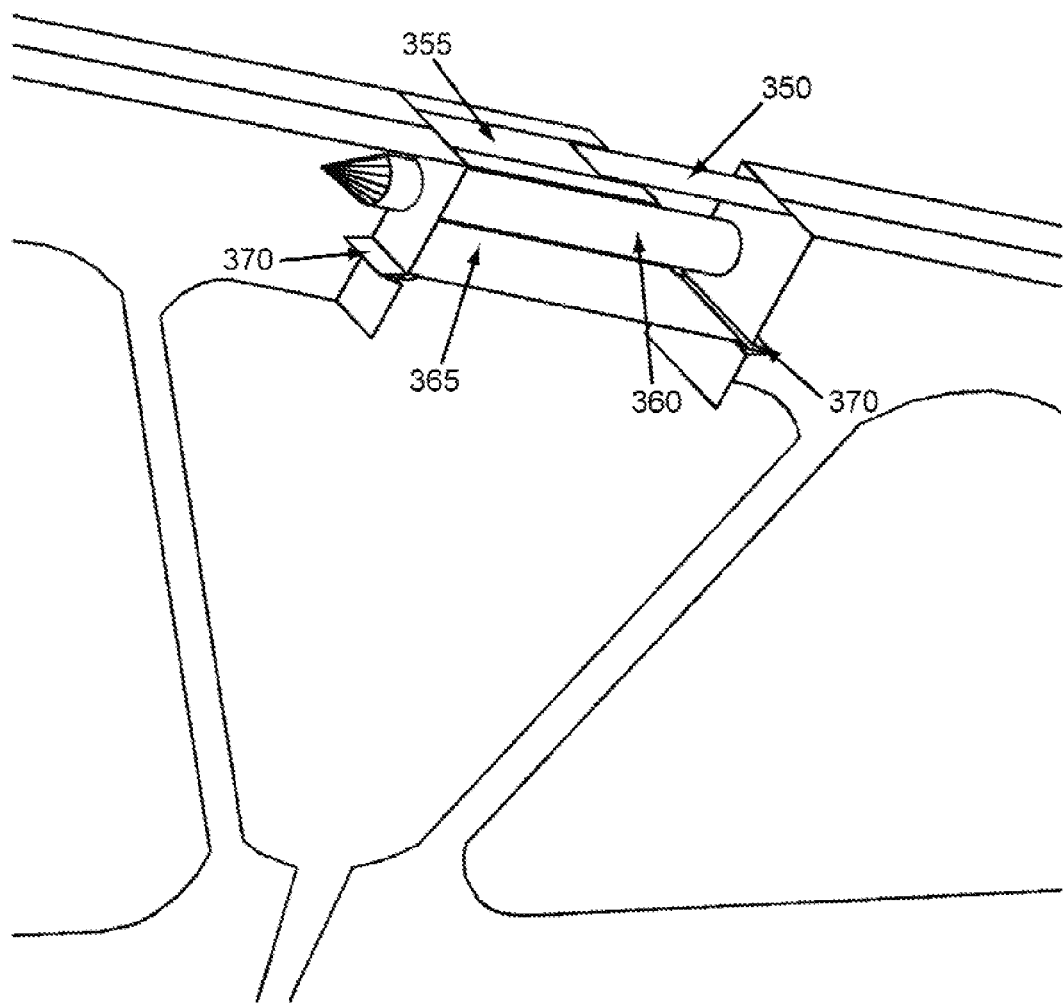
FIG. 13 is a perspective close up of the second embodiment of the buckling section with a buckling member (365).
Figure 14:
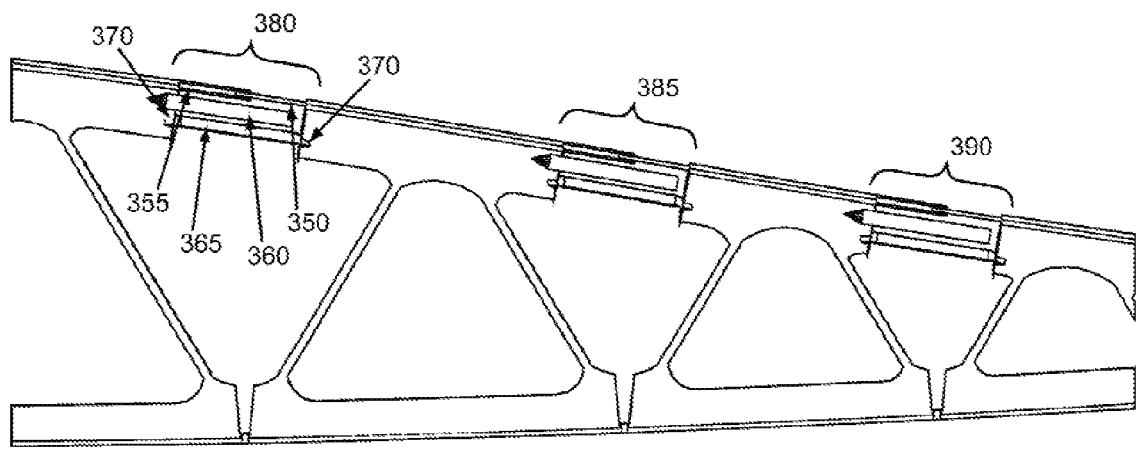
FIG. 14 is a side view of the second embodiment of the buckling section being used on the first embodiment of the structural member.

FIG. 13 is another design using a stopper bar, 360, buckling member, 365, holders for the buckling member, 370, and a sliding structure for additional support with a notch, 355, and a bar, 350, which will slide together once the buckling member, 365, buckles. FIG. 14 shows how multiple buckling members, 380, 385, 390, using the components in FIG. 13, can be utilized in the overall structure.

The same structures used in active morphing wings that maintain the aerodynamic properties of the wing during activation and morphing could also be used in passive morphing wings to maintain the aerodynamic shape of the skin during these morphing events.

Buckling Member

In past wing designs, buckling members were used to establish the step-wise deflection response, while shape memory polymer elastomers were integrated into the wing shell to enable seamless shape change. Buckling members are useful in this application since they have several parameters that can be varied to achieve the desired response. These parameters include cross-sectional shape, effective buckling length, end conditions, location and orientation in the structure, materials, and if composites are used, several additional parameters can be introduced. The key is understanding how each of these parameters impacts the design response and fatigue properties.

The concept of buckling is not new. However purposefully designing an object or structure to buckle is unheard of in most applications. This is due to the fact that designing an element to buckle will reduce the amount of a load that element can sustain in the structure. Thus, many engineers, architects, and other designers will not use or design a member to buckle within a structure.

Proper material thickness, width, height, and cross-sectional geometry of any buckling member will be highly critical to the structure and support of a structure containing a buckling member. Though buckling beam behavior has been usefully exploited in the background art, this exploitation has been in micro and nano-scale applications. Also, the buckling beam members have not contributed to structural integrity or been designed to resist load. A structure is presently disclosed that incorporates rigid phases and phases designed to buckle. The rigid phases provide structural integrity and are capable of a statically bearing load. These rigid phases are fabricated from typical structural shapes and materials.

The buckling phases are fabricated from structural elements designed to buckle under certain loading conditions, including but not limited to load magnitude, direction, duration, or frequency. The structural elements themselves are fabricated from fiber-reinforced polymer composite.

The combination of rigid and buckling phases allows the bulk structure to posses a plurality of stable configurations.

Each configuration exhibits structural integrity, stability, and rigid support of certain loads. Transition between configurations is accomplished through deformation of the structure under certain loading conditions; said deformation is accomplished through buckling of the buckling phase structural elements.

The behavior of buckling members allows the bulk structure to make nonlinear, stepwise transitions between configurations. Once buckling is initiated, the buckling member offers little support and the structure deflects until it is prevented from deflecting any more. Thus, for one load condition the structure will exhibit bulk deformation to a second configuration.

This configuration may be maintained by a load condition less than that of the initiating condition. This is due to the hysteresis inherent to beam buckling behavior; the load required to maintain a beam in a buckled state is less than the load required to initiate a buckled state.

During all transitions and configurations, the bulk structure maintains structural integrity and the ability to support load through the rigid phases. This requires that the design of the structure provides for the transfer of loads within the structure such that the yield strengths of the elements are not exceeded. Each configuration will disperse the load through the structure in a different way. The structure's configurations and transient states will require thorough and iterative analysis to determine the bulk and local behavior under both static and dynamic loads.

Each application of a buckling structure will require a careful selection of design variables. The buckling behavior of the fiber reinforced polymer composite is a function of the member's geometry, boundary conditions and integration with rigid structure, load orientation and path, and the traditional design variables associated with composites such as ply schedule, resin or matrix properties, fiber properties, and weave design.

To demonstrate this iterative procedure, the following embodiment is provided. Each application of a buckling structure will require a careful selection of design variables. This example is merely one application and is not limiting of the scope of this document.

It is preferred that the rigid elements must have a greater structural stiffness than the buckling members to concentrate the deflections to the buckling members and the pivot locations.

The reinforcement is a 4 ply layup of carbon fiber, oriented in the ±45° direction. The matrix is a toughened resin matrix. The element may be fabricated by vacuum molding a commercial pre-preg material per manufacturer specifications.

This example describes one-dimensional deformation in response to a one-dimensional load; this does not limit the scope of the present disclosure. Complex applications of the present disclosure can incorporate many loading scenarios, multiple stable structural configurations, many different materials, and different composite designs for each of many composite buckling members. Deformation can be accomplished in many planes, even simultaneously, with insightful placement of buckling phases.

The buckling region and buckling member design process to enable HALE aircraft rib structures to respond passively to gust events began with airfoil analysis. The pressure distributions determined during airfoil analysis were translated into trend equations designed to be mapped to finite element models within finite element analysis (FEA) programs. Next, a baseline rib structure was constructed as a surface model using computer-aided drafting (CAD) software. For the case discussed, the widths of the flange that forms the outer airfoil profile and the flange that interfaces with the spar are both one inch. The chord length is 96 inches, and the maximum airfoil thickness is approximately 11 inches. Tubular truss members are located throughout the thickness of the rib. The truss members are oriented in 60° angles relative to each other and taper off into the web portion of the rib.

After the structural configuration of the baseline model was determined, the ply schedule of the structure was determined to develop an understanding of load transfer through the structure and to provide a baseline for weight comparison. Understanding how loads are transferred through the structure leads to a determination of how and where to insert the passive adaptive regions.

Sizing was conducted via linear and non-linear static FEA, with non-linear being preferred, of the surface model depicted using the ALGOR® FEA software package. The limiting component of discretization of the baseline model was geometry accuracy as opposed to stress variation with varying degrees of freedom. As a result, discretization of the model resulted in a fine mesh and a relatively high number of shell elements (146,000) due to the complex nature of the geometry of the baseline rib structure. A fewer number of elements did not accurately capture fine detail geometry areas, including truss member shape, truss member to rib web interface, rib flange to rib web interface, and rib flange to rib flange interface. Model boundary conditions included the mapped pressure distributions on the rib flange and a fixed boundary condition at the interface between the rib and the main aircraft spar. In order to reduce potential stress concentrations in anticipated higher stress areas, mesh refinement points were used.

Materials selected for use in the rib structure were determined by scanning through published data on similar aircraft and application of engineering judgment based on composites design expertise and experience. Considering the aerospace application, material data for a high-modulus carbon fiber-epoxy laminate was applied to the model. Room temperature mechanical and physical properties for this laminate are shown below in Table 1.

TABLE 1

| Property | Plain weave high-mod carbon fiber-epoxy |
|---|---|
| Specific Gravity | 1.5 |
| E1 (Msi) | 9.4 |
| E2 (Msi) | 9.4 |
| Poisson's Ratio 12 | 0.06 |
| Tensile Strength 1 (Ksi) | 124 |
| Tensile Strength 2 (Ksi) | 124 |
| Compressive Strength 1 (Mpa) | 91.4 |
| Compressive Strength 2 (Mpa) | 91.4 |

The ply sizing approach involved first significantly over-designing the rib structure by using a high number of plies and then gradually reducing the number of plies until one of two conditions were met: the stress factor of safety of 1.15 or acceptable deflection magnitudes less than 0.0394 inch (1 mm), or the further reduction of plies that would result in non-symmetrical or un-balanced ply schedules.

Ply sizing resulted in the second condition of retaining a balanced, symmetrical ply schedule being used as the metric for the minimum number of plies. Each structural member part has four plies of the plain-weave, high-modulus, carbon fiber-reinforced, epoxy laminate, but the ply orientation varies from part to part.

With the baseline design established, the next step was to begin the design process for the structural configuration of a wing rib with buckling members positioned between truss members near the upper airfoil surface. The decision was made to maintain a majority of the characteristics of the baseline rib configuration while designing the passive adaptive rib, because it provides the opportunity for rather straightforward placement of the buckling members, and provides the ability to compare the passive adaptive design with the baseline configuration to quantify performance trades.

Three buckling regions were added into the design to account for three levels of gust magnitude. Each bucking region includes a buckling member, a stopper bar, a pivot region, and a sliding flange interface. The buckling member is placed within the web of the rib near the upper surface in order to transfer normal operating loads effectively through the region by maintaining a high cross-sectional moment of inertia. When a critical load is reached causing a buckling member to buckle, the portion of the airfoil behind that buckling region pivots upwards. The axis of rotation for the pivot is forced to fall in the pivot region below the buckling member due to the removal of the web material in that area. When the deflection reaches its engineered limit for changing the pressure distribution of the airfoil shape, it is halted by coming into contact with the stopper bar. The stopper bar is a tubular structure placed above a buckling member. It is more robust then the buckling member, so it will withstand and transfer higher loads through the structure after the structure buckles. Finally, the sliding flange interface represents a mechanism that allows the upper surface of the rib on each side of a buckling member to flex uniformly across the gap created by the buckling region. Thus, the rib maintains a smooth aerodynamic profile even when the buckling members buckle and the buckling region pivots.

A series of flanges create a V-shaped groove that the buckling members slide into. The V-shape of the groove allows the buckling members to pivot as if they were in a pin-pinned configuration. The pin-pinned configuration forces the transfer of an axial load through the buckling member, which simplifies the design and analysis process. An additional flange extends from the end of the V-shaped flange and into the web to help distribute loads across the full width of the buckling member rather than concentrating the load where the web intersects with the buckling member. The flanges also increase the stiffness of the structural components that are not meant to deflect to ensure that the deflection is isolated to the buckling members.

The buckling members were drawn the same in each region. The length of the curved section of each buckling member is 3 inches. The model includes buckling members with four different radii for the curved section in each buckling region so that trade space studies can be performed that show the effect of curvature on the loads required for and the non-linearity of the buckling response. The four radii are 1.5 in., 2.0 in., 2.5 in, and 3.0 in. Buckling members with shorter radii have deeper curvature, typically require higher critical loads to buckle, display greater non-linear responses, and are more likely to delaminate or yield during buckling.

The approach for sizing the design configuration involves applying the ply schedules as used for the baseline model and then stiffening specific regions as necessary. With structural member ply schedules identified for the new design configuration, individual buckling region design can begin.

Each buckling region undergoes a two-step design process: first a tradespace study is performed, and then fine tuning and simulation is carried out. Tradespace studies are conducted to investigate the effect of a select set of design variables and allow for selection of the best combination of values for design variables to enable the desired performance. This information is then transferred into a non-linear stress analysis for fine tuning of the design variables to achieve a model with a higher level of fidelity. Once one region is sized to buckle at the desired load, sizing of the next buckling region begins.

Buckling member sizing needs to occur for two forms of loading: in-flight pressure distributions and vertical trailing edge loading for experimental validation. Ply schedule sizing for the in-flight pressure distributions results in stiffening of structural components near the buckling member regions. The primary reason for this is the re-distribution of loads throughout the structure due to removal of the rib web and flange in the buckling member regions. Although the buckling members were put in place of the rib web sections, they can support only axial loads and not shear or bending moment loads due to the pin-pinned end conditions on the ends of the buckling members. As a result, that shear load is re-distributed into the truss members neighboring the buckling member regions, thus necessitating stiffening of the truss members to compensate for the additional load.

The material selected for use in the buckling members was a plain weave, standard modulus, L930 carbon-fiber epoxy pre-preg from JD Lincoln, Inc. This material was selected due to its increased toughness over the carbon-epoxy composite used for the other structural components, allowing for repeated buckling cycles with minimal material degradation. Factors such as length and radius of curvature also play a role in buckling member survivability and are taken into account when selecting buckling member designs as seen in Table 2.

TABLE 2

| Property | L930 - JD Lincoln carbon - epoxy laminate |
|---|---|
| Specific Gravity | 1.5 |
| E1 (Msi) | 8.8 |
| E2 (Msi) | 8.8 |
| Poisson's Ratio 12 | 0.04 |
| Tensile Strength 1 (Ksi) | 97 |
| Tensile Strength 2 (Ksi) | 97 |
| Compressive Strength 1 (Ksi) | 92 |
| Compressive Strength 2 (Ksi) | 92 |

Boundary conditions for the buckling region trailing edge force the model to consist of fixed conditions at the section where the remainder of the model is cut-off, pinned end conditions on the buckling member, and nodal forces applied at the trailing edge. After running a critical buckling analysis, a buckling load multiplier and mode shape are produced. This multiplier is then multiplied by the applied trailing edge force to calculate the buckling load.

Analysis on this model for the first buckling region ran multiple times while radius of curvature or ply schedule was varied for each case. Results for these models were then assembled into a carpet plot demonstrating the critical load for region one with varying radius of curvature and ply schedule.

Based upon the results in this particular trade space study for the first buckling region, 4 ply buckling members with a radius of curvature of approximately 2 inches will satisfy the buckling load goal of five pounds applied perpendicularly to the trailing edge. The resulting ply schedules also provide a basis for weight comparison between the baseline structure and the structure with buckling regions.

Buckling members were fabricated and tested to experimentally validate the results of FEA. A mold was machined from polycarbonate with the profile of the buckling member with a radius of curvature of two inches. Polycarbonate was selected to withstand the minimum cure temperature of JD Lincoln L930 pre-preg selected for the composite, which is approximately 96 degrees Celsius. Composite buckling members can be fabricated on any material that can maintain the profile, that can withstand the cure temperatures, that is compatible with the chemicals in the pre-preg, or that can be sealed so that the chemicals in the pre-preg do not come in contact with the material.

The overall length of the fabricated buckling members is four inches, and the width is one inch. There is a 0.25-inch-long flat region at each end of the buckling member, and then a 0.25-inch-long transition region that changes from the flat section to the section with a two-inch radius. The center section with a constant two-inch radius is three inches long.

Covering the polycarbonate buckling member mold with Teflon tape will protect the mold surface. To fabricate buckling members, four plies of JD Lincoln L930 pre-preg oriented in the ±45° direction were first cut, and then laid up by hand onto the mold. The JD Lincoln L930 pre-preg includes 3K70P carbon fabric and a highly toughed epoxy matrix. The highly toughened matrix enables buckling to occur without yielding or damaging the buckling members within the designed limits of deflection. A layer of porous Teflon fabric was then placed over the top of the plies to create a mold release surface and to act as a breather layer to extract air from the part during vacuum bagging. The mold was then placed on a sheet of glass, vacuum tape was placed on the glass offset from the perimeter of the mold, and a vacuum bag was placed over the mold and sealed to the tape. Then, vacuum was drawn with a standard laboratory vacuum system to remove all air from the mold and apply pressure to the plies. The part was then cured on the mold in an oven for four hours at 100° C. After part cure, the buckling members were removed from the mold and the edges were sanded to achieve the final dimensions required for insertion into a test fixture.

Performance of the fabricated buckling members was evaluated on a test fixture modeled after a section of the trailing edge of the rib structure. The buckling member was inserted into the buckling region, and weight was hung from the trailing edge of the structure while a video camera recorded the response of the buckling member. In addition, a digital indicator was used to record deflection as a function of load. The tests recorded on video demonstrated a non-linear deflection response, including buckling, as the load was increased on the structure. The critical buckling load was approximately four pounds, which is near the five pound designed critical buckling load.

Wing Skin in Passive Morphing Systems

Pre-straining the skins will prevent skin wrinkling and out-of-plane deflections. Introduction of pre-strained elastic skins into the structural design will also help to reduce or eliminate the skin wrinkling experienced as a result of the large structural deflections stemming from the inherent flexibility of lightly loaded HALE aircraft.

The skin is pre-strained to maintain a sufficient level of retraction force as well as use the tension to help minimize out-of-plane deformations resulting from the in-flight surface pressure.

It is preferred to use elastomers rather than SMP for passive morphing to avoid the need for skin activation. This helps minimize weight and reduces power requirements for the HALE application. However, SMP could be used if desired.

Chemicals in Wing Skin

Environmental effects at high altitudes, such as atomic oxygen (AO), ultraviolet (UV) radiation, and low temperatures (−75° C. at the top of the troposphere near the equator), must be considered when selecting the appropriate materials for the skin and substructure. Silicone-based elastomers offer exceptional resistance against the effects of UV and AO but lack tear resistance and integrity when in a thin film. Cyanate ester (CE) elastomers exhibit significantly greater tear resistance and modulus over traditional silicone elastomers, maintain elastic properties at temperatures approaching −100° C., provide maximum strains exceeding 100%, and offer the ability for use in standard composite processes such as vacuum assisted resin transfer molding (VARTM) or resin transfer molding (RTM). Although not fully quantified, the inherent chemistry of the CE elastomers is designed to provide superior resistance to the effects of UV radiation and AO. In the case of AO, CE elastomers are designed to be self-passivating, meaning they will create a protective barrier layer in the presence of AO, which offers the potential for long-lasting durability. All materials will be evaluated against these characteristics mentioned and other environmental factors including chemical resistance (i.e. fuel exposure), extreme temperatures (sitting on the tarmac versus high altitudes), and moisture absorption.

Graded Matrix Composites

Graded matrix composites (GMC) are lightweight, structural composite systems fabricated using resin that can be thermally softened and subsequently hardened. This feature provides the ability to soften a structural element, alter its shape, and then return it to a rigid state in its new configuration. GMCs have a very narrow temperature range in which they transition between hard and pliable. This narrow glass transition temperature span allows a GMC to maintain full structural rigidity up to a specifically-designed activation temperature.

The ability to reconfigure a structure and then regain its original stiffness enables extreme flexibility in adaptive component design. GMCs also offer shape memory recovery that can offer added functionality to most applications. Shape memory effects are typically a secondary feature to most applications.

Additionally, GMCs allow for multiple composites to be used in a single sheet of composite, providing for greater flexibility in the design of morphing structures.

Pre-Strained Nature of Skin

As a result of the inherent deflection under gust conditions, the perimeter of the airfoil will vary in length, requiring the use of an elastic skin that will permit deflection and still support aerodynamic loads. Appropriate skin configurations, fastening, and techniques are required to pre-strain the skins to prevent skin wrinkling and out-of-plane deflections. Introduction of pre-strained elastic skins into the structural design will also help to reduce or eliminate the skin wrinkling experienced as a result of the large structural deflections stemming from the inherent flexibility of lightly loaded HALE aircraft.

To stretch out the skin for the first time, it is preferred to use a stretch rack. By clamping two metal rods on one end of the rack, the wing skin sock can be slipped onto these rods, stretched, and then placed over the wing skin. FIGS. 21 through 23 show this process. FIG. 21 shows the unstretched wing skin, 650, next to the wing frame, 655. As shown in FIG. 22, the wing skin, 660, is stretched over the wing frame, 655. As shown in FIG. 23, the wing skin, 670, covers the wing frame, 655. The final size of the wing skin, 670, is larger than the original size, 650. This pre-straining of the wing skin allows for movement of the wing skin during morphing without creating creases or wrinkles in the wing skin.

Attachment to Wing Skin

The primary focus of this section is to disclose a variety of different methods of joining the SMP skin system to the structure in an active morphing wing or a passive morphing wing. Two methods for achieving this were pursued: mechanical fastening and adhesive bonding. The first method was investigated by incorporating carbon fiber weave into a portion of the SMP sample.

The second method investigated involves adhering neat SMP samples to AA 7075-T651 strips and then testing them using the ASTM D1002 lap-shear method in the static state. Two types of adhesives were investigated: Loctite® Hysol EA9396 and 3M® AF163-2 epoxy film adhesives. Five samples of each type were created and tested.

During testing below the $T_g$ of the samples, all five of the 3M® AF163-2 samples and three out of five of the Loctite® Hysol EA9396 samples showed failure of the SMP substrate and not of the adhesive or the adhesive interfaces.

During development cohesive failure in the samples when tested 20° C. above the materials $T_g$ was experienced. This was a direct result of bonding an elastomeric material to a rigid substrate. When force was applied, the elastomer deformed, forming a stress concentration along the leading edge of the bond line. When this stress exceeded the strength of the bond line, the bond failed and the stress concentration propagated through the bond. Ultimate failure then occurred when the stress concentration propagates through the entire bond, like a zipper. This problem was overcome by creating a bond line with such strength that the SMP failure occurs prior to failure of the leading edge bond line.

For the morphing wing application, the high-strain skins will be fastened to a rigid structure. This type of attachment results in high stress concentrations at the fastener locations and enables identification of attachment region. A design was developed for the skin attachment that will be incorporated directly into the substructure. Several different innovative attachment techniques have been researched for this application. A practical solution for fastening the morphing skin utilizes two clamping pieces that secure the skin to the 1 inch attachment region at the end of the honeycomb substructure. The fastening regions as well as the substructure should be built using the SLS rapid prototype material, Duraform®EX.

Figure 15:
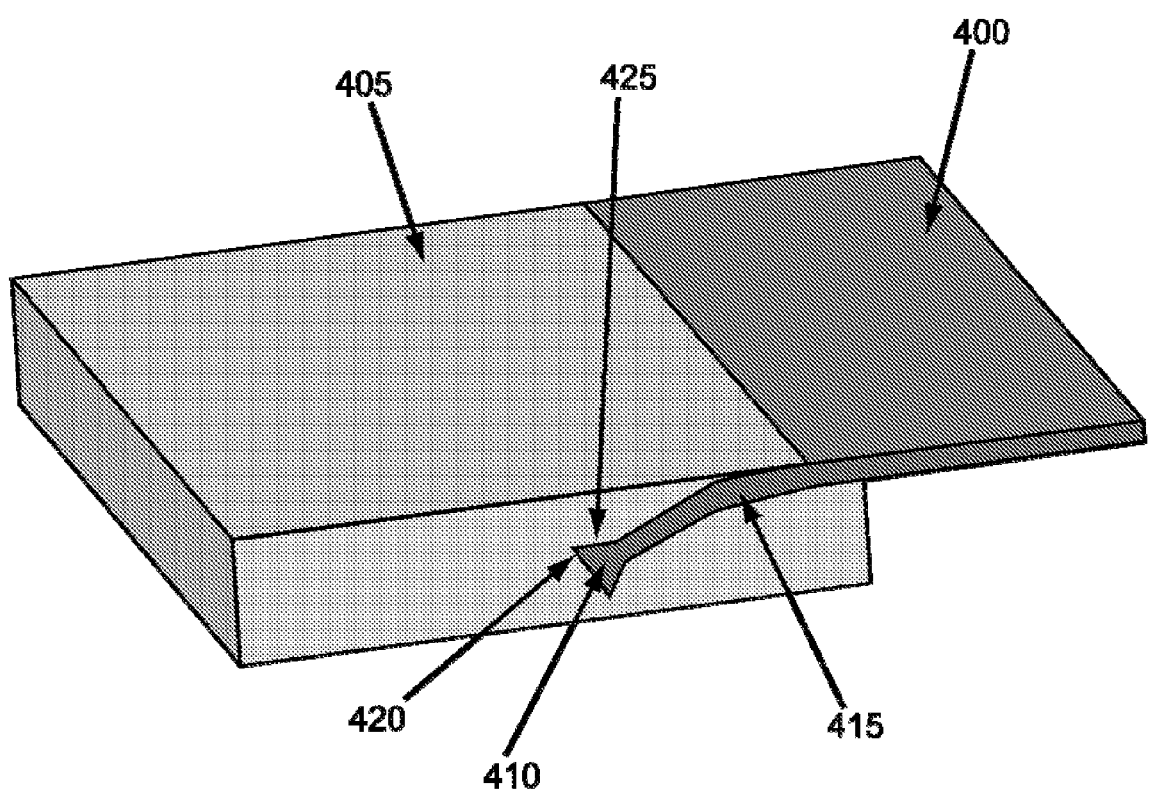
FIG. 15 is a perspective view of one embodiment of attaching a wing skin to the structural frame.
Figure 16:
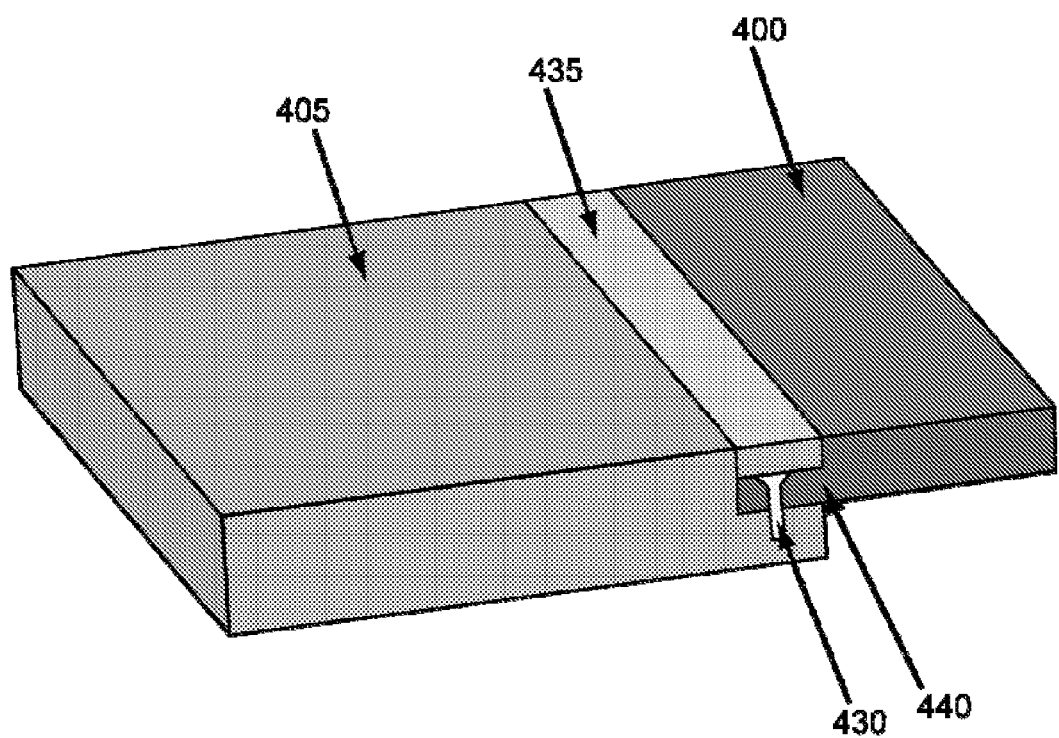
FIG. 16 is a perspective view of a second embodiment of attaching a wing skin to the structural frame.

FIG. 15 shows one method of attaching the wing skin, 400, to the body of a structure, 405, by allowing a piece of the wing skin, 415 to be inserted into the structure, and expanded, 410, in a hollow, 425, such that the expanded part, 410, touches all edges including the back edge, 420. FIG. 16 is another method of attaching the wing skin to the body of the structure, 405, wherein the wing skin, 400, is attached with a bolt or screw, 430, and covered by a patch, 435.

What is claimed is:

1. An airfoil system comprising:
    an airfoil with a leading edge, a trailing edge, an upper surface, a lower surface, and a skin surface;
    at least one structural element located within said airfoil;
    wherein said structural element supports the skin surface having an upper skin portion and a lower skin portion wherein said structural element can change shape in response to external stimulus during flight operations;
    actuating means for selectively altering the curvature of said structural element which alters the curvature of said upper skin portion and of said lower skin portion to cause nonlinear deflection of said skin surface between an extreme raised position through a neutral position to an extreme lowered position; whereby the outer surface curvature of said airfoil and said skin surface is continuous over substantially the entirety thereof at all positions of said skin surface.

2. An airfoil comprising:
    an airfoil structural frame comprising a leading edge, a trailing edge, and a skin surface;
    at least one structural element located within said airfoil structural frame;
    wherein said structural element is configured to deflect or yield at least one nonlinear shape change in response to an external stimulus;
    wherein said airfoil structural frame is a wind turbine blade, aircraft wing, helicopter rotor, or other aerodynamic structure.

3. The airfoil of claim 2 wherein said nonlinear shape change to a deflected shape occurs at a first predetermined amount of said external stimulus.

4. The airfoil of claim 3 wherein said structural element returns said deflected shape to said aerodynamic shape at a second predetermined amount of said external stimulus.

5. The airfoil of claim 4 wherein said second predetermined amount of said external stimulus is less than said first predetermined amount of said external stimulus.

6. The airfoil of claim 2 wherein said nonlinear shape change is a stepwise shape change.

7. The airfoil of claim 2 wherein said external stimulus is a wind gust or turbulence.

8. The airfoil of claim 2 wherein said structural element has an actuating means for selectively altering said aerodynamic shape in response to said external stimulus.

9. The airfoil of claim 8 wherein said actuating means is a passive actuating means.

10. The airfoil of claim 9 wherein said passive actuating means is a buckling member within said structural element.

11. The airfoil of claim 10 wherein said buckling member is a fiber reinforced polymer composite.

12. The airfoil of claim 2 wherein said nonlinear shape change to said deflected shape mitigates a change in an aerodynamic load created by said external stimulus on said aerodynamic shape.

13. The airfoil of claim 2 wherein there is a stopping member capable of limiting said nonlinear shape change.

14. The airfoil of claim 13 wherein said stopping member limits said nonlinear shape change to the desired deflected shape.

15. The airfoil of claim 2 wherein said skin surface remains continuous over substantially the entirety of said aerodynamic shape and said deflected shape.

16. The airfoil of claim 15 wherein said skin surface is a prestrained deformable composite.

17. The airfoil of claim 15 wherein said skin surface is seamless.

* * * * *